Patented July 30, 1929.

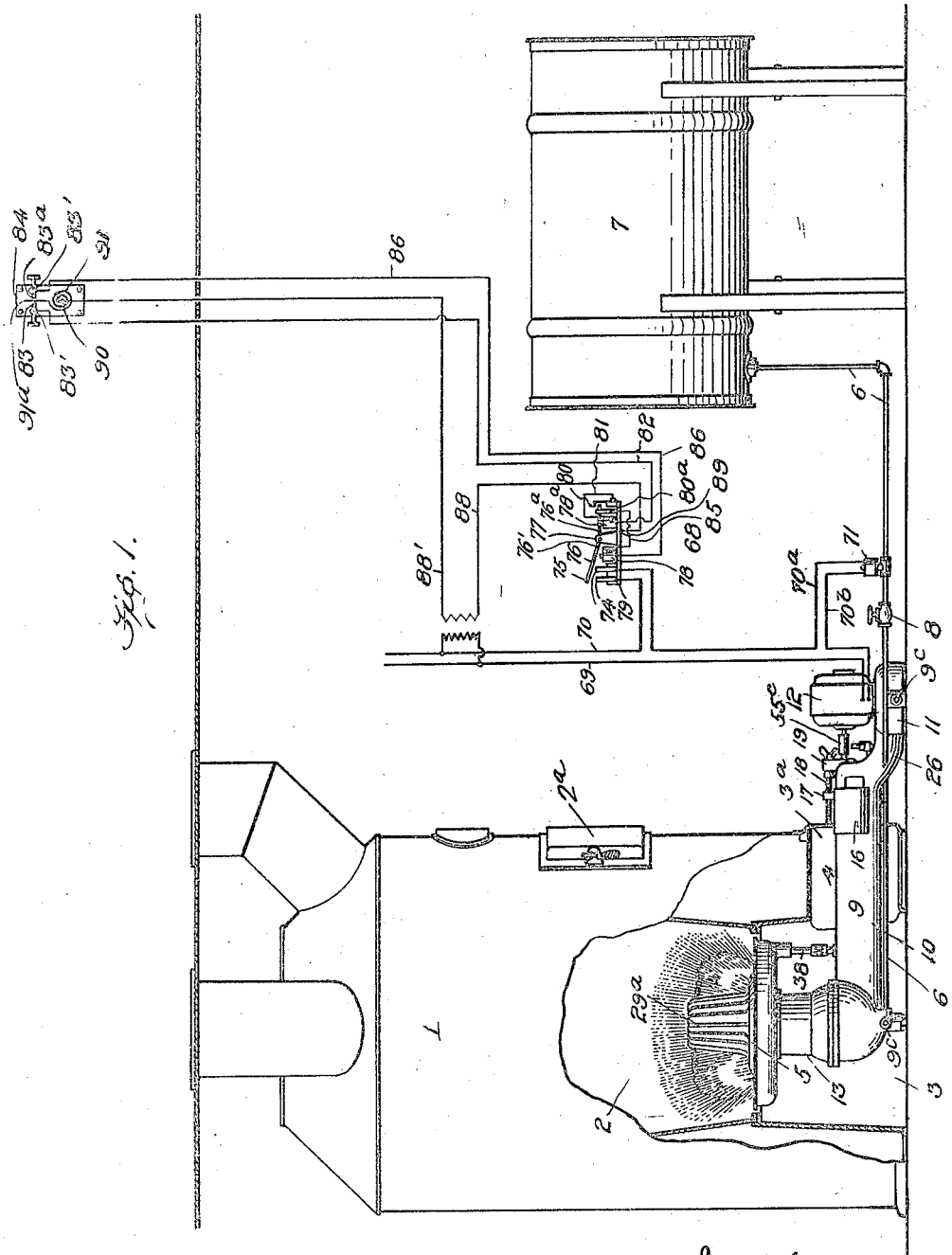

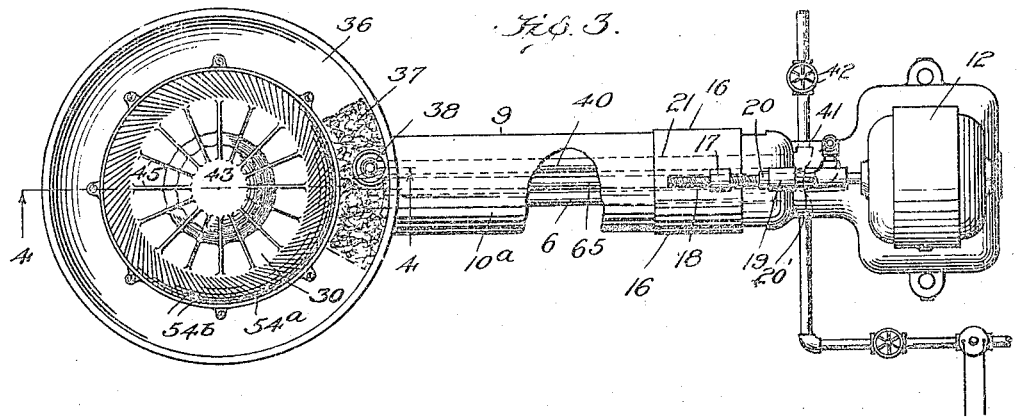
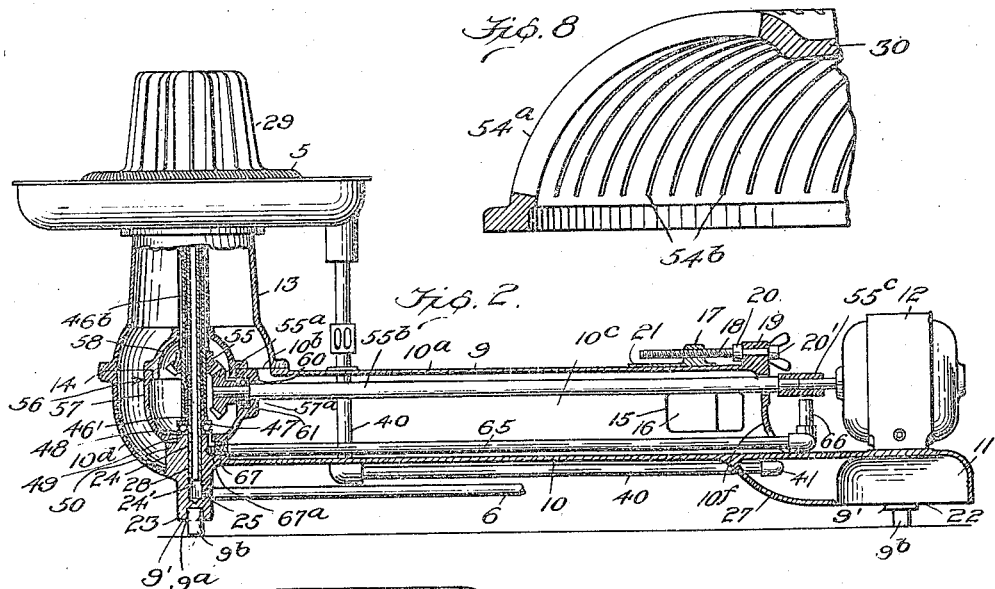
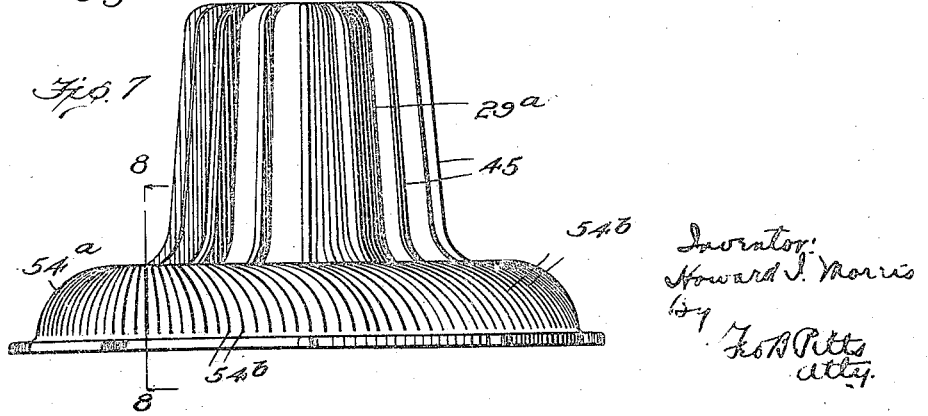

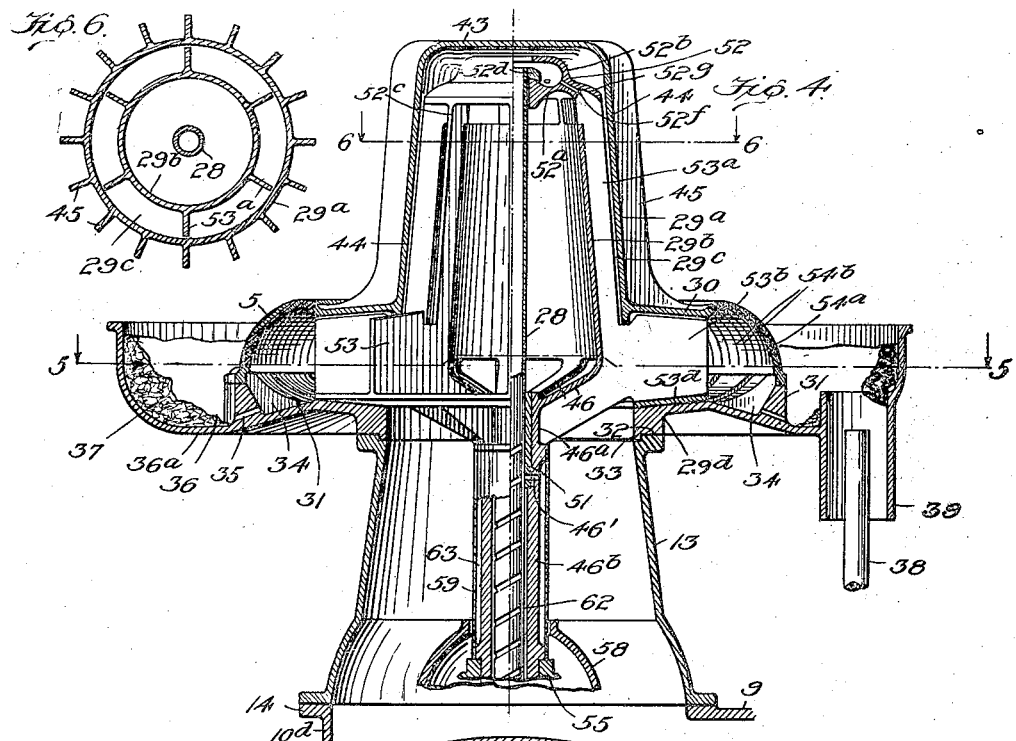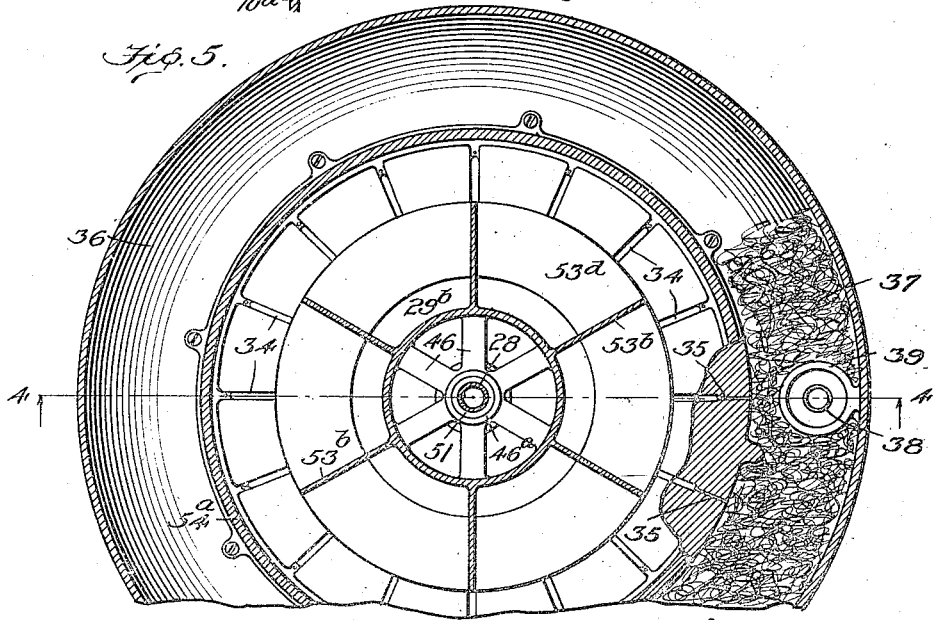

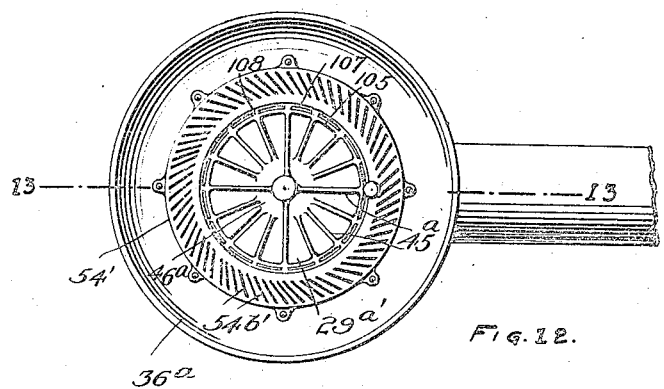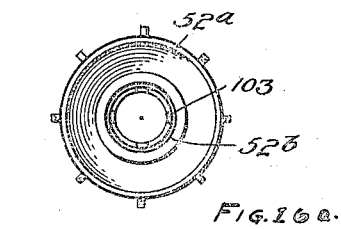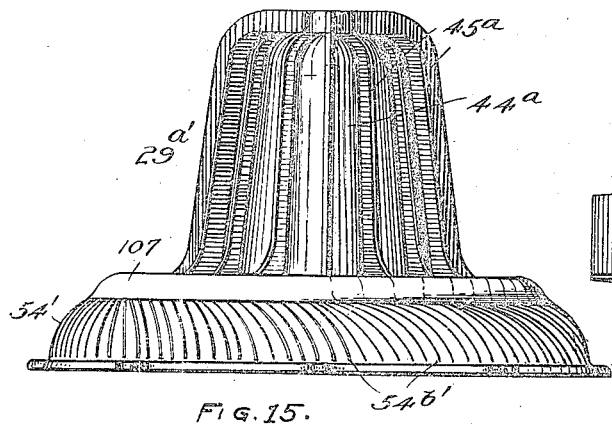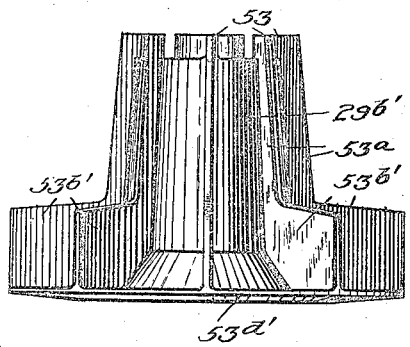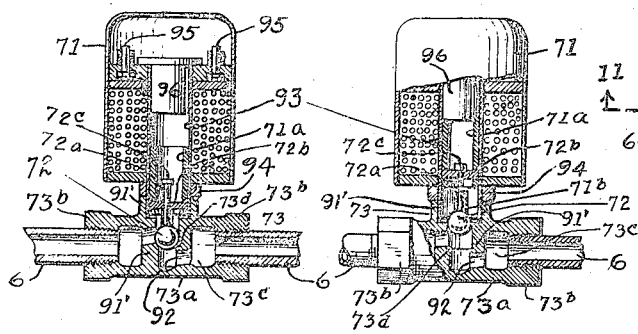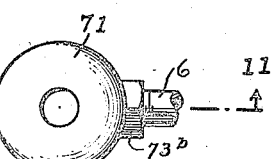

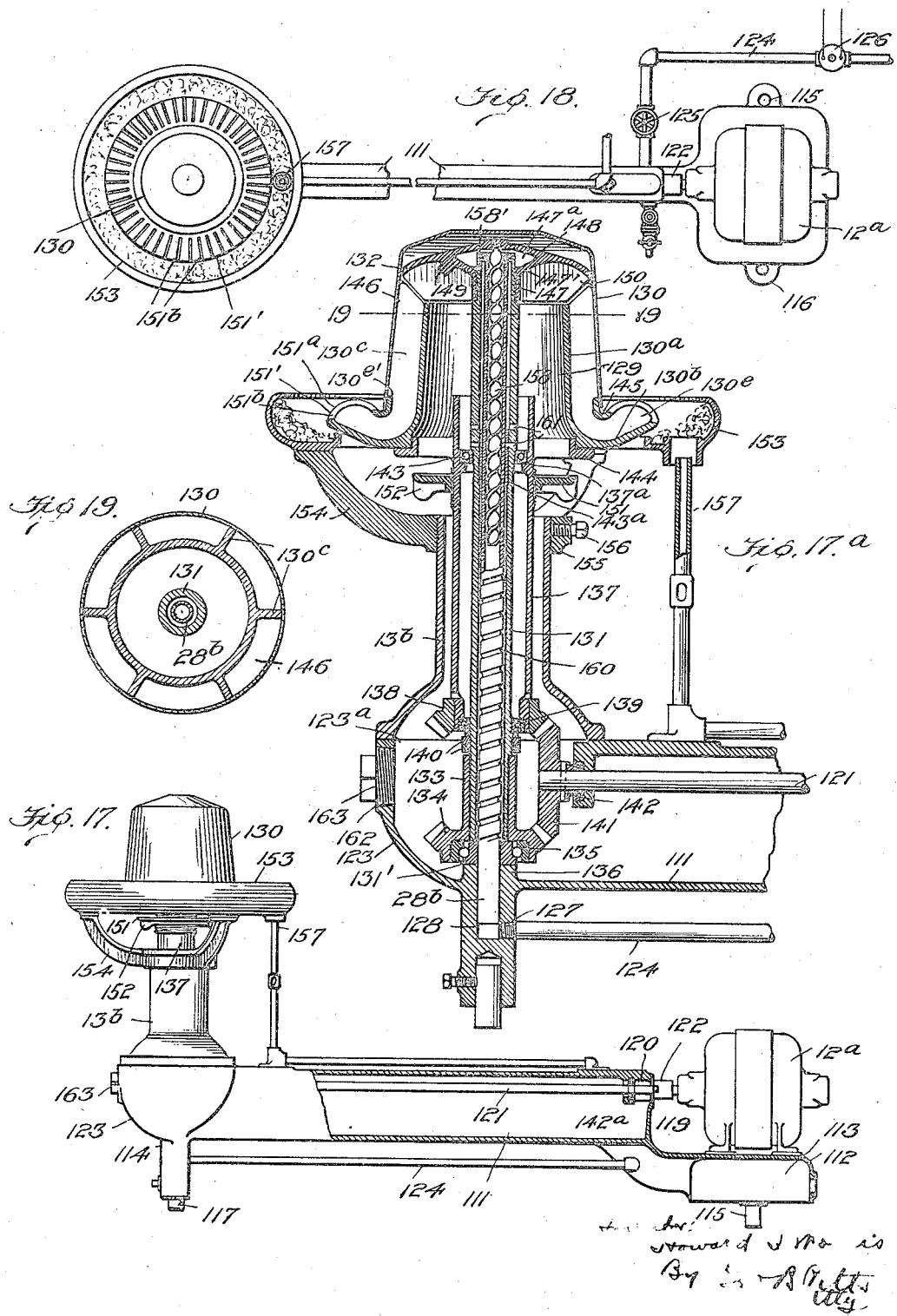

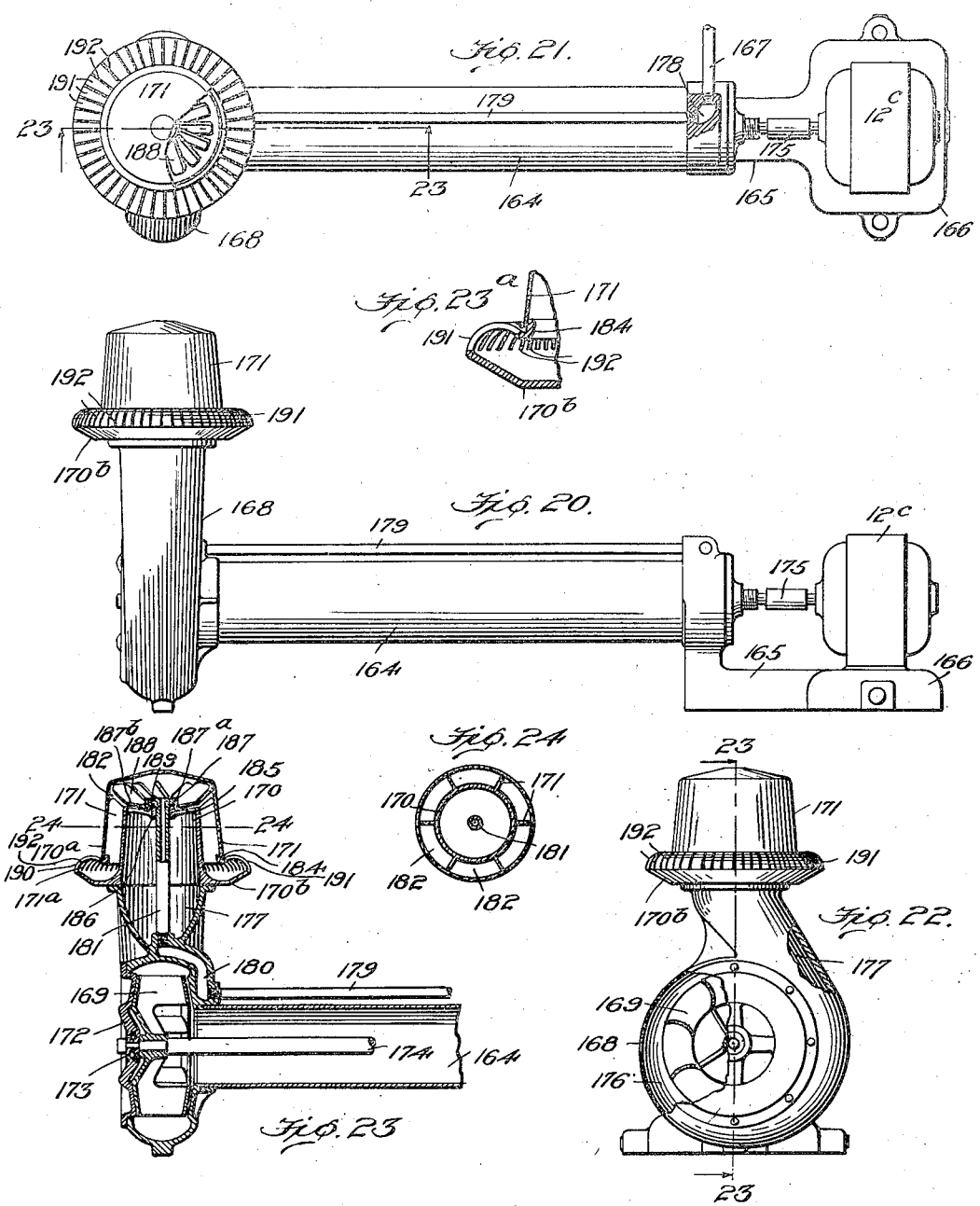

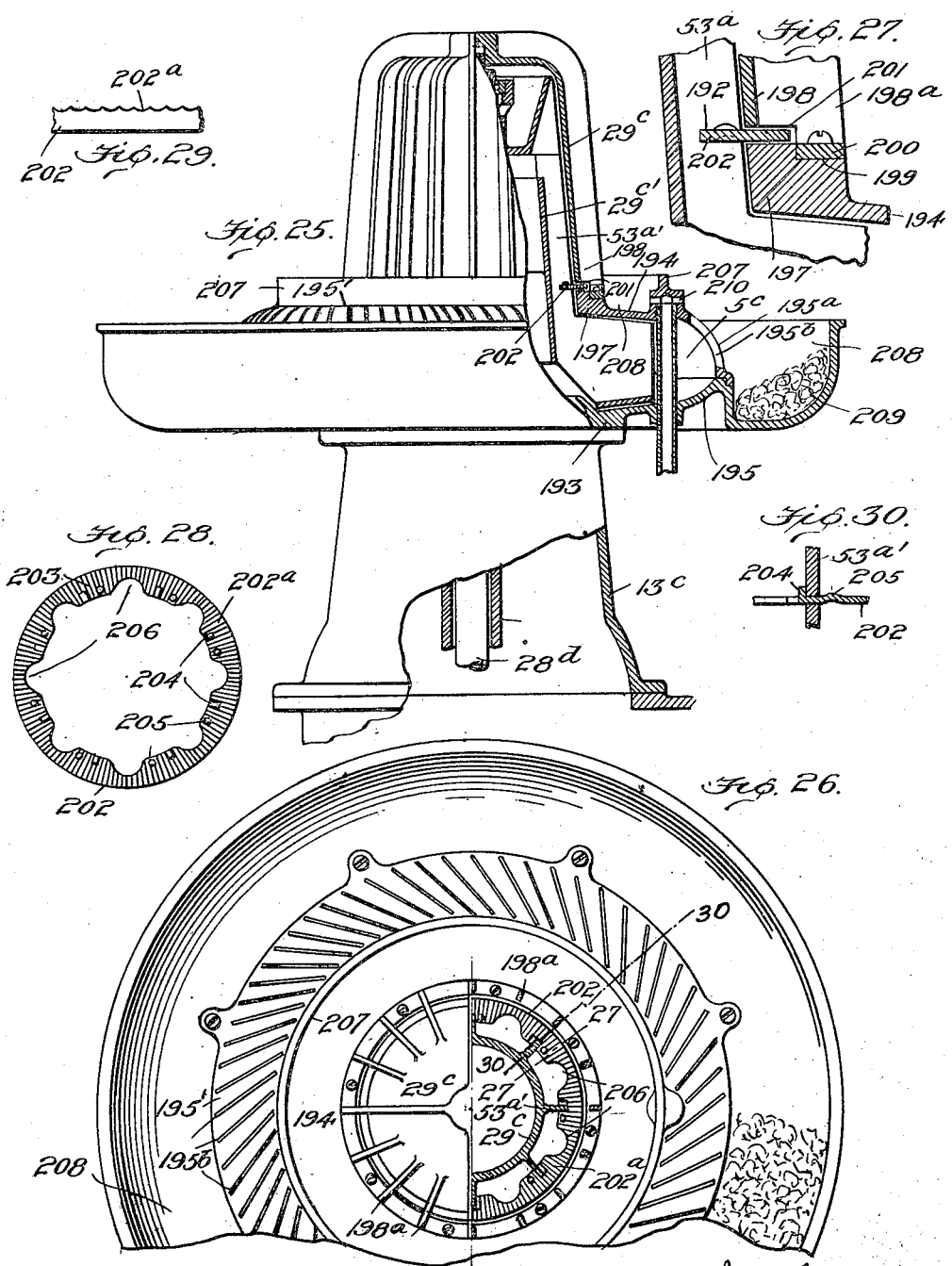

1,722,504

UNITED STATES PATENT OFFICE.

HOWARD I. MORRIS, OF CLEVELAND, OHIO, ASSIGNOR TO THE YODER-MORRIS COMPANY, OF CLEVELAND, OHIO, A CORPORATION OF OHIO.

FUEL-BURNING MECHANISM AND PROCESS OF CONDITIONING FUEL FOR BURNING PURPOSES.

Application filed April 15, 1922. Serial No. 553,076.

This invention relates to a mechanism for and process of burning fuel, such as fuel or other oils, or other combustible materials. For illustrative purposes, as well as to show one preferred adaptation of the invention, I have shown it applied to or associated with a furnace of the type in common use for heating buildings or houses.

One object of the invention is to provide a fuel burning mechanism that is relatively simple in construction and capable of conditioning the oil or other combustible material to effect substantially complete combustion thereof.

Another object of the invention is to provide an improved fuel burning mechanism wherein the fuel to be burned is conditioned and mixed with proper proportions of air to insure its complete combustion, thereby (1) eliminating the deposit of carbon and other ingredients of the fuel, on surrounding objects, the generation of obnoxious gases, and (2) providing economical operation and maximum heating effects per unit volume of fuel.

Another object of the invention is to provide a fuel burning mechanism in which the oil or material to be burned is conducted to and maintained in contact with or thrown against a wall arranged in close proximity to the flame of the burner, whereby such oil or material is vaporized for burning purposes.

Another object of the invention is to provide a fuel burning mechanism in which (1) the oil or material to be burned is conducted through a passage or passages having a wall disposed in close proximity to the flame of the burner to insure conditioning of the oil or material for burning purposes and (2) means are provided for maintaining said wall substantially free of carbon deposit.

Another object of the invention is to provide in a fuel burning mechanism novel means for (1) breaking up the oil or material to be burned to insure ready and complete vaporization thereof and (2) mixing air with the vaporized fuel.

Another object of the invention is to provide a fuel burning mechanism in which the fuel is conducted to and thrown against a wall disposed in close proximity to the flame while in contact with air or gas, whereby the fuel is intimately mixed with air during its vaporization.

Another object of the invention is to provide in a fuel burning mechanism, (1) means for conditioning the fuel for burning before reaching the ignition point and (2) means for insuring ignition at or beyond a predetermined point, whereby conditioning of the fuel may be completely effected, the flame controlled and pre-ignition avoided.

Another object of the invention is to provide an improved temperature controlling means for a fuel burning mechanism, whereby the latter will be controlled automatically, substantially uniform temperature is maintained and economical operation results.

A further object of the invention is to provide a novel fuel burning mechanism in which rotary or centrifugal operating devices act upon the vaporized fuel and air or gas to mix them in proper combustible proportions and to force them in their conditioned state under pressure to the nozzle for burning, whereby efficient heating and economical operation are effected.

A further object of the invention is to provide an improved fuel burning mechanism in which any and all fuel, which in its conduction to the nozzle remains in liquid or unvaporized condition, is collected at a point in the intermediate vicinity of or adjacent to the nozzle, whereby the flame burning therefrom serves to finally vaporize such fuel.

A further object of the invention is to provide an improved method of vaporizing fuel and mixing air therewith, whereby the fuel is conditioned to insure substantially complete combustion before its ignition.

A further object of the invention is to provide a novel valve for cutting off and admitting the supply of fuel to insure positive as well as instant opening or closing of the valve, whereby waste of fuel is avoided and combustion of fuel under abnormal conditions is prevented.

Other objects of the invention will be apparent to those skilled in the art to which my invention relates from the following description taken with the accompanying drawings.

Referring to the drawings, Figure 1 is an elevational view, partly diagrammatic, showing a furnace, and a fuel burning mechanism and a control mechanism (which said mechanism or mechanisms embody my invention) combined or associated therewith.

Figure 2 is a side elevation of the fuel burning mechanism, parts being shown in section.

Figure 3 is a top plan view of the parts shown in Figure 2.

Figure 4 is a section of the line 4—4 of Figures 3 and 5, enlarged, part of the inner member of the burner being shown in elevation.

Figure 5 is a section of the line 5—5 of Figure 4.

Figure 6 is a section of the line 6—6 of Figure 4.

Figure 7 is an elevation of one of the burner members and the means for preventing pre-ignition.

Figure 8 is a fragmentary section on the line 8—8 of Figure 7.

Figures 9 and 10 are plan and side views, respectively, of the valve for the fuel supply pipe, the latter view being partly in section on the line 11—11 of Fig. 9.

Figure 11 is a section on the line 11—11 of Figure 9.

Figure 12 is a top plan view of a burner embodying a modified form of construction.

Fig. 15 is an elevation of one of the burner members constituting the burner shown in Figs. 12, 13 and 14.

Figure 13:
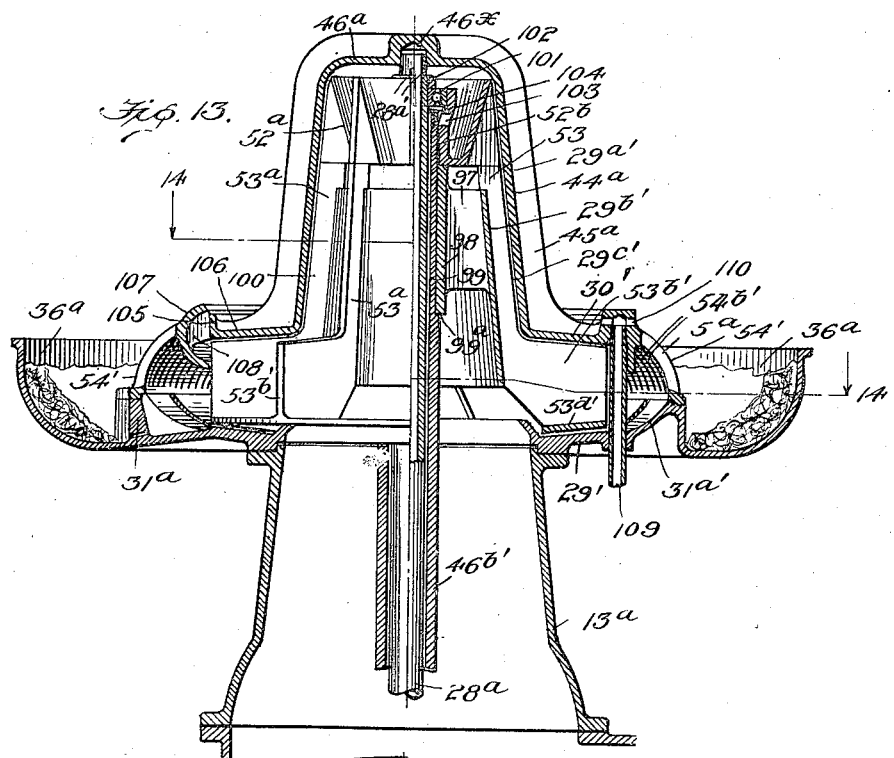
Figure 13 is a section on the line 13—13 of Figure 12, enlarged.
Figure 14:
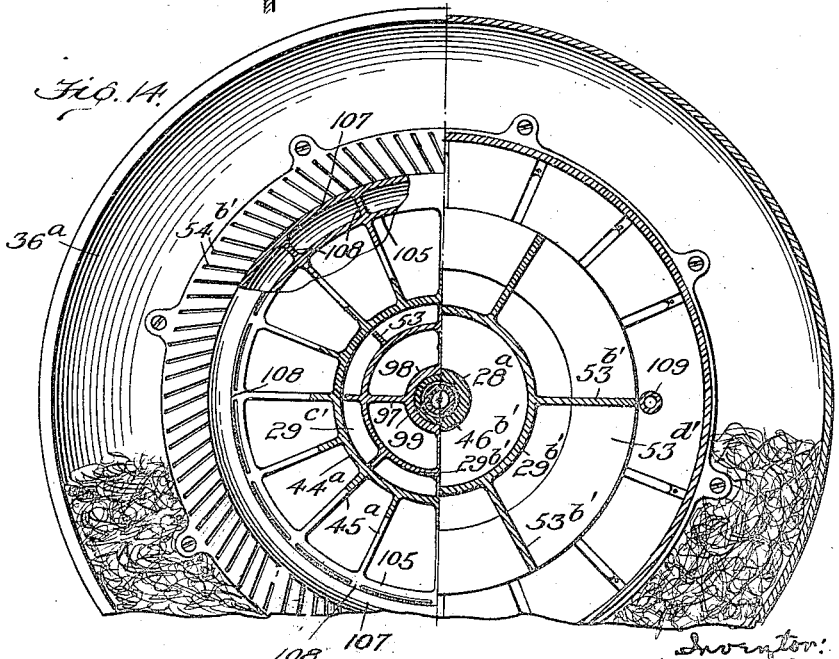
Fig. 14 is a section on the line 14—14 of Fig. 13.

Fig. 15$^a$ is an elevation of the other burner member.

Figs. 16 and 16$^a$ are side and top plan views, respectively, of the receiver and fuel spraying device.

Fig. 17 is a fuel burning mechanism, parts being in section, of another form of construction embodying my invention.

Fig. 17$^a$ is an enlarged fragmentary view of the mechanism shown in Fig. 17, parts being broken away.

Fig. 18 is a top plan view of the parts shown in Fig. 17.

Fig. 19 is a section on the line 19—19 of Fig. 17$^a$.

Fig. 20 is a side elevation of another form of construction embodying my invention.

Fig. 21 is a top plan view of the mechanism shown in Fig. 20, parts being broken away.

Fig. 22 is an end view of Fig. 21, parts being broken away.

Fig. 23 is a section on the line 23—23 of Figs. 21 and 22.

Fig. 23$^a$ is a fragmentary section similar to Fig. 23, enlarged.

Fig. 24 is a section on the line 24—24 of Fig. 23.

Fig. 25 is a side elevation, partly in section, showing a further modified form of construction embodying my invention.

Fig. 26 is a view, partly in plan and partly in section of the parts shown in Fig. 25.

Fig. 27 is a fragmentary section on the line 27—27 of Fig. 26.

Fig. 28 is a plan view of the fuel and carbon collecting ring.

Fig. 29 is a fragmentary end view of the collecting ring.

Fig. 30 is a fragmentary section on the line 30—30 of Fig. 26, enlarged.

In the drawings, 1 indicates a furnace of any suitable construction. The furnace is provided with a fire box 2, a door 2$^a$, and an ash-pit 3 having an entrance opening 3$^a$, leading thereto, the door for the opening 3$^a$ being omitted.

A fuel burning mechanism, indicated as an entirety at 4, is shaped or fashioned to extend through the opening 3$^a$ and, by preference, supports the burning nozzle 5 (1) concentric to the fire box 2 and (2) approximately in the plane in which the furnace grate bars (not shown) were supported before their removal; although it will be obvious that this arrangement is not essential.

6 indicates the supply pipe for the fuel to be burned, such pipe leading from a storage tank 7, preferably supported on a level above the nozzle 5, to permit the fuel to feed by gravity thereto.

By the term "fuel" I have in mind fuel oils, crude oils and residuum oils, which I have successfully used in operating in a practical manner my fuel burning mechanism; but it will be understood that the invention is not limited to the use of such oils, nor to any particular material or materials or combination of materials.

8 indicates a cut-off in the pipe 6, this cut-off or valve being provided for the purpose of manually controlling the supply of fuel through the pipe 6, either to cut off the supply permanently or regulate the amount which may flow through the pipe from the storage tank 7.

9 indicates a support preferably of hollow construction to form (1) a housing for certain elements to be later referred to and (2) a conduit for delivering or supplying air or other gas for mixture with the fuel, preferably during its vaporization and after it has been vaporized, in the manner to be later set forth. The housing preferably comprises a main tubular section 10, which may be substantially circular in cross section, a base section 11 disposed at the outer end of the main section 10 and arranged to support a motor 12, and a supplemental tubular section 13 which is removably mounted on the inner end of the main section and which supports the nozzle 5 and other elements, to be later referred to, for conditioning the fuel for ignition or burning from the nozzle. At its inner end, the upper wall 10$^a$ of the main housing section is cut away at 10$^b$ and the side walls 10$^c$ are connected by an end wall 10$^d$, the upper edge of the end wall co-operating with the edges defining the cut-away 10$^b$ to form a seat 14 for the lower end of the supplemental section 13 (see Figure 2). One or more walls of the main section 10, for example each of the side walls 10$^c$, is formed with an opening 15, through which air or other gas is admitted to the housing 9. The opening 15 may be made larger or smaller by the adjustment of a plate 16; such plate being movable to a position to entirely close the opening 15 when desired. Any suitable means may be provided for moving the plate 16, that shown consisting of a lug 17 integrally mounted on the plate 16 and having a screw-threaded opening to receive the screw-threaded portion of a rod 18 rotatably mounted in a bearing formed in a thickened portion 19 provided on the housing section 10. The rod 18 is held against endwise movement by a pair of collars 20, 20', fixed in any suitable manner to the rod and engaging the opposite ends of the bearing. As the collar 20' preferably consists of a winged nut, its wings provide ready means for rotating the rod. By preference, both side walls 10$^c$ may be formed with air inlet openings 15, in which event the adjusting plates 16 therefor may be connected together by a section 21 and both operated by a single adjustment means, such as that just described.

As shown in Figures 1 and 2, the base 11 is provided with integral depending walls 22 and the inner end of the section 10 is provided with a leg 23, which walls 22 and leg 23 serve to support the housing at its opposite ends in a substantially horizontal position, as shown in Figure 1. The leg 23 is preferably formed with two openings 24, 25, extending inwardly from its upper and inner sides or faces, respectively, and the inner ends of these openings merge into a chamber 24' formed in the leg, such openings and chamber serving as a conduit for the fuel as will be obvious from the following description. The supply pipe 6 leads through an opening formed in the flange 26 and brace wall 27 of the section 11 (see Figures 1 and 3) and then longitudinally of the section 10, the free end of the pipe being fitted in the opening 25.

28 indicates a pipe which, at its lower end, fits into the opening 24. The pipe 28 extends upwardly through the housing section 13 and delivers the fuel from its upper end, whereby the same may be vaporized, as will be later described. As shown, the opening 24 in the leg 23 is so arranged that the supply pipe 28 may be arranged centrally of the section 13.

29 indicates as an entirety the burner wherein the fuel is vaporized and mixed with air or conditioned for burning and then discharged through the nozzle 5. The burner comprises a pair of concentrically arranged outer and inner members 29$^a$, 29$^b$, the walls of which are spaced from each other to form around the inner member a passage 29$^c$ into which the fuel in liquid form is discharged for vaporization as it flows to the nozzle 5. The members 29$^a$, 29$^b$, preferably conform to the shape of the nozzle and are arranged therewithin. The members 29$^a$, 29$^b$, extend beyond the nozzle 5 (that is, upwardly in the arrangement shown in the drawings) into or within the zone of the flame burning from the nozzle, whereby the wall of the outer member may be heated and maintained in heated condition by the flame; accordingly, by preference, the members 29$^a$, 29$^b$, are annular and preferably inclined toward their upper or outer ends. The walls of the members are preferably substantially parallel to each other from end to end.

In the forms of construction shown, the burner is arranged vertically and for convenience in terminology I shall use the terms upper and lower as applicable to the arrangement illustrated, but it will be understood that these terms are not intended to limit the invention to the arrangement illustrated as the burner may be arranged in other positions, for example, horizontally, and operate in the manner to be described.

In the form of construction shown in Figures 1 to 8, inclusive, and Figures 12 to 15, inclusive, the inner member is rotated relative to the outer member; whereas in Figures 16 to 22, the walls of the outer and inner members are fixed relative to each other. In view of these differences the walls of the burner members and the nozzle therefor are different in detail construction. Accordingly I will proceed to describe each form of construction separately.

Referring to Figures 1 to 8, inclusive, 29$^d$ indicates an annular member surrounding the pipe 28 and co-operating with an annular plate 30 spaced from it to form a radially extending outlet the outer end of which supports the nozzle 5. The annular member 29$^d$ extends outwardly beyond the outer circumferential edge of the plate 30, as shown at 31 and such extended portion is curved laterally relative to the plane of the nozzle, so that the latter will direct the vaporized fuel or the flame from the nozzle 5 upwardly when the burner is arranged vertically, as shown in the drawings.

The annular member 29$^d$ is provided with a seat 32 flanged at 33 which seat and flange fit correspondingly shaped walls on the upper end of the housing section 13, such arrangement insuring concentricity of the burner member 29$^a$, which is supported by the annular member 29$^d$ in the manner to be later set forth.

At 34, the upper surface of the extension 31 is formed with slots, the bottom walls of which are inclined downwardly and the outer side wall of the extension is formed with openings or ducts 35, one leading from the outer end of each slot 34, through which the fuel (when in liquid condition) flows as will later be set forth. The slots 34 and ducts 35 preferably extend radially. 36 indicates a trough surrounding the nozzle 5 and arranged to receive the fuel flowing from the ducts 35. By preference, the bottom wall 36ª of the trough is formed integrally with the extension 31 so that the nozzle 5 will be in or closely adjacent to the trough. As the trough receives and holds a quantity of fuel which flows or escapes through the ducts 35 and this fuel is utilized to ignite the vaporized fuel flowing through or from the nozzle 5 in starting the burner, the function of the trough 36 and the advantage in arranging it in close proximity to and around the nozzle 5 will be at once apparent. I prefer to place in and around the trough a quantity of asbestos or other suitable material, indicated at 37, which becomes saturated with the liquid fuel and serves as a sort of wick to spread the flame around the trough. The fuel collected in the trough is ignited by a pilot device of any suitable construction, the illustrated construction shown by way of example being a gas pipe 38, the jet end of which extends through a tubular section 39 formed integrally with the wall of the trough. When gas is used as a pilot device, the supply pipe 40 may extend downwardly through the upper wall 10ª and bottom wall 10ᶜ of the housing section 10 and then longitudinally thereof; at 41 the pipe 40 extends through the flange of the section 11 to a source of supply. 42 indicates a valve for the pipe 40.

The upper end of the outer member 29ª is preferably closed by an end wall or plate 43. The plate 43 is preferably formed integrally with the outer end of the side wall 44 of the member 29ª; the inner end of the side wall 44 is preferably formed integrally with the inner circumferential edge of the plate 30. As the plate 30 is relatively narrow, it will be seen that the side wall 44 of the member 29ª will be arranged in close proximity to the flame burning from the nozzle 5 and be heated thereby sufficiently to insure vaporization of the fuel discharged into the passage 29ᶜ, as will later be described. To insure absorption of the heat by or conduction thereof to the side wall 44 of the burner member 29ª, the latter is provided with a plurality of spaced fins or ribs 45 preferably extending radially therefrom.

When the supply pipe 28 is arranged vertically, and the other elements are associated therewith, as shown in the drawings, the burner member 29ª may be termed an inverted cup member, but the use of such term is not for the purpose of limiting nor intended to limit the scope of the invention, for reasons already set forth. Furthermore, attention may be directed to the fact that in describing the nozzle forming elements and the elements associated therewith as annular, applicant is not to be understood as limiting the invention to that shape as each thereof may be of square, rectangular or other shape.

The inner member 29ᵇ is preferably hollow to permit air, supplied through the housing member 9, to flow to its inner end and be discharged into the passage 29ᶜ for mixture with the fuel as it vaporizes and to assist in conveying the vaporized fuel to the nozzle 5. At its lower end, the inner member 29ᵇ is provided with inturned arms 46, connected to a collar 46ª, which in turn is connected to the upper end of a sleeve shaft 46ᵇ surrounding the pipe 28. At or near its lower end, the shaft 46ᵇ is provided with a bushing 46′ which rotatably fits the pipe 28. 47 indicates a thrust bearing for the lower end of the shaft 46ᵇ. The lower race 48 of the bearing may be mounted on the upper end of an annular boss 49 provided on a pedestal 50 cast integral with the walls of the housing section 10. Near its upper end, but preferably at a point below the nozzle 5, and within the collar 46ᵇ is provided with a bushing 51 which rotates on the pipe 28 and co-acts with the bushing 46′ to rotatably support the shaft 46ᵇ on the pipe 28.

52 indicates a device arranged at the outer end of the fuel supply pipe 28 and beyond the upper end of the inner burner member 29ᵇ. The device 52 operates to receive the fuel from the pipe 28 and discharge it in sprayed form or condition into the upper end of the passage 29ᶜ. In the form of construction being referred to, the spraying device 52 consists of an annular member having a bottom 52ª and a side wall 52ᵇ which is curved upwardly and inwardly to form a receiver into which the liquid fuel flows from the pipe 28. 52ᵈ indicates a nut or other device fixed to the free end of the pipe 28 for holding the spraying device 52 thereon. The spraying device 52 is preferably connected to the inner member 29ᵇ so as to be rotated thereby. The connection between the inner member 29ᵇ and spraying device 52 may consist of spaced ribs 52ᵉ integrally connected therewith, the spaces between the ribs 52ᵉ permitting the air or gas to pass from the inner member into the passage 29ᶜ. 52ᶠ indicates openings formed in the side wall 52ᵇ of the spraying device, said openings preferably extending radially in a downward direction and serving to discharge the fuel into the passage 29ᶜ, and in an outward direction against the inner surface of the wall 44 of the outer burner member 29ª. As the device 52 rotates at a relatively fast rate, and the fuel flows in fine streams from the openings 52ᶠ, it is broken up and sprayed centrifugally against the wall 44, whereby it may be quickly vaporized by the heat of the wall 44. The side wall 52ᵇ of the spraying device is preferably provided with a downwardly inclined flange 52ᵍ, which serves to direct the sprayed fuel downwardly.

53 indicates a plurality of spaced blades arranged radially of the side wall of the inner member 29$^b$, and preferably extending from end to end thereof. The blades 53 are preferably formed integrally with the inner member 29$^b$ and may be extensions of the ribs 52$^c$ already referred to. The blades extend across the space constituting the passage 29$^c$, as indicated at 53$^a$, their free edges being parallel to and terminating closely adjacent to the inner surface of the wall 44; at the lower end of the passage 29$^c$ the blades are extended, as shown at 53$^b$ and occupy the space between the annular plates 29$^d$, 30. The lower edges of the blade sections 53$^b$ may be connected together by an integral annular plate 53$^d$. The different sections of the blades operate as follows: the blade sections 53$^a$ operate on the liquid fuel delivered by the spraying device 52 to (a) throw it, by centrifugal action, against the inner surface of the wall 44, such operation being supplemental to the spraying action of the spraying device 52 and by the same action, maintain it against such surface throughout the length of the passage 29$^c$ as the fuel flows therethrough to insure vaporization of all the fuel before it reaches the nozzle 5; (b) cause mixing of the air conducted to the passage 29$^c$ with the vaporized fuel as it becomes vaporized in the passage 29$^c$; and (c) to scrape from the inner surface of the wall 44 carbon which may accumulate thereon from time to time in excess of the clearance between the free edges of the blades and the wall 44. The blade sections 53$^b$ serve to (a) mix the vaporized fuel and air delivered from the passage 29$^c$ and air drawn up through the housing 13, whereby the fuel is completely conditioned for ignition or burning and (b) force the conditioned fuel through or from the nozzle 5 under pressure. In practical use of my fuel burning mechanism, I have found that the construction and arrangement is such that in operation the element serve within the burner or at a point within the nozzle opening to uniformly and continuously mix the vaporized fuel and air in proper proportions to insure or effect complete combustion of the fuel at or beyond the nozzle opening.

There is provided means for preventing pre-ignition of the burning fuel in the nozzle or between the inner and outer members and for maintaining the ignition of the fuel at or beyond a predetermined point, viz, the nozzle opening. The means preferably comprise an annular wall 54$^a$ which extends across the nozzle 5 throughout its circumference and is formed with a plurality of slits 54$^b$ through which the conditional fuel passes. Ignition takes place on the outer surface of the wall 54$^a$, the slits being of a size to prevent backfire into the space behind the wall 54$^a$, and causing pre-ignition therein. The slits 54$^b$ are preferably arranged at an angle that is substantially tangential to a circle concentric to the axis of the burner members 29$^a$, 29$^b$. This arrangement of the slits 54$^b$ is advantageous as it permits the conditioned fuel to flow through the nozzle in the direction in which it is forced outwardly by the blades 53$^b$. The arrangement also effects a spreading of the flame rather than permitting it to be affected by air currents and directed upwardly centrally of the furnace. The wall 54$^a$ is preferably convexed and may be formed integrally around its inner edge with the outer edge of the plate 30. The outer edge of the wall 54$^a$ preferably engages the upper edge of the wall 31, being secured thereto by screws extending through openings formed in integral lugs provided on the walls 54$^a$, 31 (see Figs. 3 and 5). The wall 54$^a$ being connected to the plate 30, serves to support it and through it to support the outer burner member 29$^a$ in position.

55 indicates a power transmitting element, such as a bevel gear, fixed to the shaft 46$^b$. When such power transmitting element 55 is a bevel gear, it co-acts with a bevel gear 55$^a$ fixed to the outer end of a driving shaft 55$^b$. The shaft 55$^b$ preferably extends longitudinally of the housing section 10 through an opening formed in its outer end wall 10$^f$, where it is connected at 55$^c$ with the armature shaft of the motor 12.

56 indicates a casing arranged within the housing sections 10 and 13 and surrounding the gears 55, 55$^a$, and bearing 47. The casing 56 preferably comprises a bottom member 57 and a cover member 58, the former being formed with an opening to permit it to fit over the boss 49 and be positioned thereby, and the latter being formed with an opening through which the pipe 28, shaft 46$^b$, and a sleeve 59 (to be later referred to) extend. The casing 56 is provided for the purpose of holding a quantity of lubricant for the gears 55, 55$^a$, bearing 47 and bushing 51. The side wall of the member 57 is formed with an opening 57$^a$ through which the driving shaft 55$^b$ extends. The wall surrounding the opening 57$^a$ is thickened and formed with an annular recess 60, which receives an antifriction bearing 61 in which the driving shaft 55$^b$ is supported. The bearing 61 is preferably arranged to take thrusts end-wise of the shaft 55$^b$ resulting from the co-action between the bevel gears 55, 55$^a$. The bearing 61 is oiled from the lubricant in the casing 56. The lubricant from the casing 56 is supplied to the bushing 51 by means of a spiral groove 62 formed in the outer surface of the pipe 28 and extending from a point below the upper end of the bushing 46′ to the bushing 51. Due to its rotation, the bushing 46′ will cause the lubricant to flow upwardly through the groove 62 as the shaft 46$^b$ rotates, to the bushing 51. At 63, the bushing 51 and shaft 46$^b$ are formed with aligned openings 46ª' which permit the escape of the lubricant from the bushing 51 and groove 62 to the outer surface of the shaft 46ᵇ, whereby it may flow down the shaft into the casing 56, the sleeve member 59 being spaced from and surrounding the shaft 46ᵇ to form a conduit 63 for the lubricant as it flows back to the casing 56. The conduit 63 is preferably formed by cutting away the outer wall of the shaft 46ᵇ throughout its length from a point above the openings 46ª' to a point below the casing member 57. As shown, the sleeve member 59 extends through the opening in the casing cover member 58, where it is formed with an escape opening. The lubricant is supplied to the casing 56 through a pipe 65. The pipe extends through the housing section 10 and wall 10ᶠ thereof, its outer end extending upwardly, as shown at 66. The pipe 66 is of a predetermined height so as to serve as a gage to permit filling of the casing 56 to and maintaining of the lubricant therein at a predetermined level. The inner end of the pipe 65 fits into an opening 67 formed in the pedestal 50. The opening 67 is connected to a duct 67ª formed by recesses in the opposing walls of the boss 49 and casing member 57, which discharges the lubricant into the casing 56.

In the construction disclosed, I have for illustrative purposes, shown an electric motor connected directly with the shaft 55ᵇ, but this shaft may be driven by other suitable means. The motor or other driving means may be controlled by a suitable mechanism (indicated as an entirety at 68) the operation of which depends upon the temperature of a room heated by the furnace 1. Since the motor 12 is connected through its armature shaft to the shaft 55ᵇ, the mechanism 68 controls the current thereto. The controlling mechanism 68 operates to (a) cut off the current to the motor 12 and the supply of fuel through the pipe 6 when the temperature in a room heated by the furnace 1 rises to or above a certain degree of temperature and (b) starts the motor 12 and permits the flow or supply of fuel through the pipe 6 when the temperature of the room falls below a certain degree of temperature. Of the mechanism 68, 69, 70, indicate a pair of leads connected with a suitable source of current supply and leading to the two terminals of the motor 12. 71 indicates a solenoid preferably connected in series, by leads 70ª, 70ᵇ, with the motor 12. The core 71ª of the solenoid is connected to the valve element 72 of a valve mechanism 73, whereby the valve is opened when the solenoid winding is energized and closed when such winding is de-energized. The construction of the solenoid 71 and valve mechanism 73 will be later referred to. 74 indicates a pair of contacts disposed in the lead 70 and 75 indicates a switch arranged to engage the contacts 74 and close the circuit to the motor 12 and solenoid 71. The switch 75 is preferably connected to move with one arm 76 of a rocking plate 76' pivoted intermediate its ends on a support 77. The switch 75 comprises a plate of conducting material fixed to but insulated from the arm 76 in any desired manner. The arms 76, 76ª, of the plate 76' form armatures for electro-magnets 78, 78ª, respectively, fixed to a base 79 in any suitable manner. 80, 80ª, indicate a pair of contacts disposed above and below the arm 76ª, one contact (80) being arranged to be engaged by the arm 76ª when it is elevated and the other contact (80ª) being arranged to be engaged by the arm 76ª when it is lowered. 81 indicates a lead extending from the contact 80 to one end of the coil of the adjacent electro-magnet 78ª; 82 indicates a lead extending from the other end of the coil of the electro-magnet 78ª to the terminal of a contact 83 mounted on a suitable supporting plate 84. 85 indicates a lead extending from the contact 80ª to one end of the coil of the other electro-magnet 78; 86 indicates a lead extending from the other end of the coil of the electro-magnet 78 to the terminal of a contact 83ª mounted on the plate 84 and spaced from the contact 83. Each of the contacts 83, 83ª preferably comprises a rod which extends through and has screw threaded engagement with the wall of an opening formed in a post 83', whereby the contact may be adjusted relative to the other contact, for a reason to be later set forth. 87 indicates a transformer of any suitable construction interposed in the circuit through the supply wires 69, 70,—one side of the transformer being connected by a lead 88 to a terminal 89 on the base 79 and electrically connected with the rocking plate constituting the armatures of the electro-magnets 78 through its fulcrum and the support 77, and the other side of the transformer being connected through a lead 89 to a terminal 90 on the plate 84. 91 indicates a thermostat mounted on the supporting plate 84. The thermostat is electrically connected with the terminal 90. The free end or movable arm 91ª of the thermostat is normally disposed substantially midway between the contacts 83, 83ª, so that when movement thereof, due to temperature changes, takes place, the arm 91ª will engage one of the contacts and close the circuit through one of the electro-magnets. For example: in the position shown in the drawings, the arm 91ª is in normal position, the circuit across the contacts 74 is broken and accordingly the motor 12 is not running, the coil of the solenoid is de-energized and the valve element 72 is seated, as shown in Fig. 11, to cut off the fuel supply. If the temperature of the room rises, the thermostat arm 91ª will swing over and engage the contact 83, which is connected with the electro-magnet 78ª, but as the circuit therethrough is broken the arm 76ª being out of engagement with the contact 80, the rocking plate 76' will remain in the position shown; now if the temperature of the room falls below a certain predetermined degree of temperature, the arm 91ª will swing over into engagement with the contact 83ª; as the armature 76ª is in contact with the contact 80ª, such engagement will close the circuit through the coil of the electro-magnet 78, thereby attracting the armature 76 and closing the main circuit through the contacts 74. Upon the closing of the main circuit, the motor 12 is started and the solenoid actuated to open the valve 73. With the starting of the motor 12 and supply of fuel to the burner, the latter will be lighted by the pilot device 38 and continue to burn so long as the circuit to the motor 12 remains closed. If the heat of the room in which the thermostat 91 is placed rises above a certain predetermined degree of temperature, the arm 91ª will swing over into engagement with the contact 83. As the armature 76ª is in contact with the contact 80, such engagement will close the circuit through the electro magnet 78ª, which will attract the armature 76ª and rock the plate 76' to the position shown in full lines in Fig. 1, thereby breaking the main circuit across the contacts 74, which will cause motor 12 to stop and the valve 73 to close. The rocking plate 76' will remain in the position until the temperature of the room falls below the predetermined degree of temperature, at which time the circuit will be closed through the electro-magnet 78 in the manner already described. By adjusting the contact rods 83, 83ª, engagement of the thermostat arm 91ª therewith may be caused to take place at any desired degree of temperature above or below the degree of temperature at which the arm 91ª stands in neutral position. The thermostat 91 may be placed in any room or at any other place relative to the furnace 1 which may be determined upon.

From the foregoing description, it will be noted that when the rocking plate 76' is in either position, its movement to that position causes the breaking of the circuit through the electro-magnet coil which effected its movement to that position and closes the circuit through the electro-magnet coil which is to effect its movement to the other position upon the engagement of the arm 91ª with the other contact 83 or 83ª, such arrangement being effected by connecting the rocking plate 76' to one side of the transformer and positioning the contacts connected to the coils of the electro-magnets so that the armature when moved breaks the circuit to the electro-magnet which has caused its operation and closes the circuit to the electro-magnet which is to operate it in the opposite direction. The main circuit may be provided with a manually controlled switch (not shown).

Referring to Figs. 9, 10 and 11, 73ª indicates a valve casing having end collars 73ᵇ to which the ends of the supply pipe 6 are connected in a well known manner. 73ᶜ indicates the conduit through the casing 73ª shaped to form a seat 73ᵈ for the valve element 72, which may comprise a ball. 91' indicates a hollow boss formed integrally with valve casing 73ª and concentric to the valve seat 73ᵈ, the inner end of the boss communicating with the conduits 73ᶜ through an opening 92. 93 indicates a sleeve upon which the solenoid may be wound. The sleeve 93 is preferably extended into and has screw threaded connection with the inner wall of the boss 91'. 94 indicates a nut which is tightened on the sleeve 93 against the end of the boss, such arrangement serving to rigidly connect the solenoid in operative position to the valve casing 73ª. 72ª indicates a stem fixed to the ball 72 and loosely extending through an opening formed in a cross piece 72ᵇ carried by the lower end of the core 71ª. The upper end of the stem is provided with a head 72ᶜ, which is engaged by the cross piece 72ᵇ, carried by the lower end of the core 71ª, to lift the valve element 72 from its seat 73ᵈ when the core 71ª is operated. The core 71ª preferably comprises a section of tubular magnetic material to provide ample space for the movement of the valve stem 72ª in the manner to be later set forth. 95 indicates the terminals for the solenoid winding. 96 indicates a plug fitting into the upper end of the sleeve 93 and serving as a stop to limit the upward movement of the core 71ª, as shown in Fig. 10. When the circuit through the lead wires 69, 70, is closed in the manner already described, the solenoid will operate the core 71ª upwardly. As the core 71ª moves upwardly, it will pick up the valve element 72, through the engagement of the cross piece 72ᵇ with the head 72ᶜ, and unseat the valve element, as shown in Fig. 10. As the core 71ª will attain considerable momentum by the time it picks up the valve element 72, the latter will be operated to its full open position with a snap action or relatively quick movement, thereby permitting the full supply of fuel to flow to the burner.

The plug 96 is preferably formed of magnetic material so that it will act as an electromagnet to attract the core 71ª, thereby supplementing the action of the solenoid. This arrangement is advantageous as the plug is preferably arranged to stop the core at the point where the influence of the solenoid thereon would start to diminish, if the core was allowed to move upwardly toward the neutral point.

71ᵇ indicates a sleeve surrounding and loosely fitting the valve stem and engaging the ball 72 at its lower end. As the sleeve 71ᵇ rests on the ball, it moves upwardly and downwardly therewith. The sleeve 71ᵇ is of such length that it will be engaged by the cross piece 72ᵇ in the downward movement of the core 71ᵃ; accordingly, when the coil is de-energized, the core 71ᵃ moves downwardly and causes the cross piece 72ᵇ to strike the sleeve 71ᵇ and through it to impart a hammer blow to the valve element 72, causing the latter to dislodge any accumulation on the valve seat and positively shut off the fuel supply.

If desired, the housing 9 may be supported on a plurality of legs 9′, each of which may be adjustable to make it longer or shorter so that the housing may be properly supported in horizontal position. Each of the legs may comprise a wall having a vertical opening 9ᵃ, formed in it and a pin 9ᵇ adjustably fitting the opening and fixed therein by a suitable set screw 9ᶜ. This construction permits each leg to engage the floor irrespective of the unevenness that may exist therein.

The operation of the burner may now be set forth: The pilot 38 is maintained lighted at all times, when it consists of a gas jet. Upon the opening of the valve 73, the fuel flows through the pipes 6 and 28 and overflows from the latter into the receiver 52. The fuel is discharged from the receiver 52 into the passage 29ᶜ through which it flows. As the blades 53 are being rotated by the motor 12, they throw the fuel radially on to the extended portion 31, and such fuel will flow through the slots 34 and ducts 35 into the trough 36, saturating the asbestos 37. The fuel in the asbestos will be ignited by the pilot 38, the asbestos acting as a sort of wick and causing the flame in the trough to extend around the nozzle 5. As the rotating blade sections 53ᵇ force a portion of the fuel (which has been broken up into spray form by the centrifugal actions of the receiver and blades 53) through the slits 54ᵇ in the wall 54ᵃ, bridging the nozzle opening, this fuel is ignited from the flame in the trough 36. As the nozzle 5 continues to burn, the flame therefrom will heat the wall 44 of the outer burner member 29ᵃ, which in turn, upon attaining sufficient heat, will conduct the heat to the inner surface of the wall and thereby cause vaporization of the fuel sprayed against it by the receiving and spraying device 52. The vaporized fuel and air flows downwardly through the passage 29ᶜ into the path of movement of the blade sections 53ᵇ, and these sections will act on the vaporized fuel and the air mixed therewith and on the air flowing up through the casing section 13 to mix them and to then force the mixed fuel and air outwardly between the plates 29ᵈ, 30, through or from the nozzle opening. The air is supplied in proper proportions so that upon being mixed with the vaporized fuel the latter is conditioned for complete combustion. When the wall 44 becomes heated sufficiently so that its heat will vaporize all of the fuel sprayed against it, the flame from the nozzle takes on a substantially bluish appearance, showing that complete combustion is being effected.

It will thus be seen that as soon as the wall 44 becomes heated, all the fuel will be vaporized; thereafter the supply of fuel to the trough 36 will stop and the flame therefrom will go out. The fuel sprayed against the wall 44 is maintained in contact therewith as the fuel flows toward the nozzle 5 by the centrifugal action of the blade sections 53ᵃ throughout their length or until all portions of the fuel are vaporized. As a result of the centrifugal forces set up by the rotating blades, so long as the fuel remains in liquid form it is maintained in contact with the heated wall, thereby insuring its complete vaporization before it is acted on by the blade sections 53ᵇ. I prefer to extend the blade sections 53ᵃ across the passage 29ᶜ so that they will terminate parallel and close to the inner surface of the wall 44. By this arrangement the blade sections 53 may serve to scrape from such wall any carbon deposits which may accumulate thereon. I prefer that the clearance between the blades 53ᵃ and wall 44 shall be relatively small so as to maintain the wall 44 substantially clean or free of carbon.

I prefer to make the inner member 29ᵇ hollow and to provide air or gas discharge openings leading from its upper end into the passage or channel 29ᶜ. This arrangement permits a portion of the air or gas which is to be mixed with the vaporized fuel to flow down through the passage 29ᶜ and mix with the fuel during and following its vaporization. By allowing the air to flow through the burner as described, all the elements of the burner including the outer burner member are maintained at a relatively low temperature, so that the metal of such elements will not deteriorate from the effects of the heat from the burner. After the nozzle 5 is once lighted, the conditioned fuel discharged therefrom will continue to burn until the motor 12 and fuel supply is cut off, either manually, or by operation of the temperature control mechanism 68, already described. After the fuel burning mechanism 4 is once operated and then shut off, the fuel which has passed the valve 73 will remain in the pipes 6 and 28 ready to be immediately discharged into the receiver 52 and from the latter into the passage 29ᶜ upon the re-opening of the valve 73 and the restarting of the motor 12. Accordingly, in the operation of the motor 12 and valve 73 by means of the temperature control mechanism 68, there will be no delay in the re-ignition of the nozzle, since the latter and the trough surrounding it will be relatively quickly supplied with the necessary fuel.

In Figs. 12 to 15, inclusive, I have shown a modified form of a fuel burner. In these views, 13ª indicates a supplemental casing member. 28ª indicates the fuel supply pipe leading upwardly therethrough. 29ª′, 29ᵇ′, indicate the outer and inner burner members, respectively; the latter member being provided with spiders 97 integrally connected with a sleeve or hub 98 fitting a reduced portion 99 of the sleeve shaft 46ᵇ′. As shown, the sleeve or hub 98 engages a shoulder 99ª formed by the reduced portion 99, whereby the inner member 29ᵇ′ is rotatably supported in co-operative relation to the outer member 29ª′. 29′ indicates an annular plate seated on the upper end of the casing section 13ª and co-operating with a plate 30′ spaced from it to form a nozzle 5ª. The annular plate 29′ extends beyond the outer edge of the plate 30′ as shown at 31ª, such extended portion being curved upwardly, as shown. The burner members 29ª′, 29ᵇ′, may be similar in shape to the burner members 29ª, 29ᵇ. The side walls of the burner members 29ª′, 29ᵇ′, are spaced from each other to form a fuel passage 29ᶜ′. The upper end of the outer member 29ᵇ′ is preferably closed by a plate 46ᵃˣ. Due to the fact that the inner burner member 29ᵇ′ and the spraying device 52ª′ are mounted near the upper end of the supply pipe 28ª, the latter is extended upwardly and fits into a recess 46ˣ formed in the plate 46ᵃˣ, to maintain the pipe 28ª rigid and overcome wobbling effects resulting from the rotation of the inner member 29ᵇ′ and spraying device 52ª′. 45ª indicates ribs arranged radially on the outer surface of the side wall 44ª of the outer member 29ª′ and extending from end to end thereof; certain of the ribs preferably extending diametrically across the end plate 46ᵃˣ.

100 indicates blades disposed radially of and uniformly spaced around the side wall of the inner member 29ᵇ′. The sections 53ª′ of the blades extend from end to end of and across the passage 29ᶜ′. The sections 53ᵇ′ of the blades are disposed between the plates 29′, 30′. The blade sections 53ª′, 53ᵇ′ respectively, operate in the manner already set forth with respect to the blade sections 53ª, 53ᵇ. The inner member 29ᵇ′ is open from end to end to permit air or gas to flow into the upper end of the passage 29ᶜ′ and to the blade sections 53ᵇ′ for mixture with the vaporized fuel. To permit of this operation and thus insure the supply of sufficient air or gas to insure the proper conditioning of the fuel, the side wall of the inner member 29ᵇ′ terminates at a point above the lower edges of the blade sections 53ᵇ′ or their annular connecting plate 53ᵈ′ so that the lower and inner portions of the blade sections 53ᵇ′ may operate as a centrifugal pump to draw air or gas up through the housing and supply it for mixture with the vaporized fuel.

The spraying device 52ª′ may comprise a cup shaped member which receives the fuel delivered through ports 28ª′ formed in the pipe 28ª. As the cup is rotated, it causes the fuel to be discharged centrifugally over the upper edge of its side wall in spray form against the wall 44ª. By such action, the fuel is broken up or discharged in spray condition, so that it may be quickly vaporized as it contacts with the wall 44ª. The bottom wall of the spraying device 52ª′ is provided with an annular threaded wall 52ᵇ′, which fits over the threaded free end of the shaft 46ᵇ′. The spraying device 52ª′ is screwed down on the shaft 46ᵇ′ into engagement with the inner burner member 29ᵇ′, thus serving as a clamping device or nut to connect the inner member 29ᵇ to the shaft 46ᵇ′ and itself to said shaft and the said inner member. The upper portion of the wall 52ᵇ′ is enlarged to form a seat for an annular anti-friction bearing 101, the inner race of which surrounds the supply pipe 28ª. It will therefore be seen that the upper end of the shaft 46ᵇ′ is rotatably supported by the bearing 101. The bearing 101 is held in its seat and in operative position by a suitable nut 102, engaging the pipe 28ª above the bearing.

103 indicates ports formed in the flared portion of the wall 52ᵇ′ below the bearing 101. These ports permit the fuel which gravitates through the bearing to flow therethrough into the receiver 52ª′. I prefer to expose the bearing 101 in the manner shown to permit a portion of the fuel to flow through between the races of the bearing to lubricate it.

To prevent the fuel from flowing down between the pipe 28ª and shaft 46ᵇ′, I provide a flanged ring 104 which snugly fits the pipe 28ª and bridges the space between these elements, the flange of the ring forming a skirt which fits over the end of the shaft 46ᵇ′ as shown in Fig. 13.

54′ indicates means for preventing pre-ignition of the fuel before it reaches the nozzle opening and for maintaining the ignition of the conditioned fuel at or beyond the nozzle opening. The means 54′ may comprise a convexed wall similar to the wall 54 already described. The wall 54′ is formed with slits 54ᵇ′ preferably arranged similarly to the slits 54ᵇ, already described.

105 indicates an up-turned flange preferably formed integrally on the circumferential edge of the plate 30′ and co-operating with the side wall 44ª or the inclined upper surface of the plate 30′ to form a channel 106 around the burner member 29ª′. 107 indicates a combined collecting and guide member surrounding the outer circumferential edge of the plate 30′ and extending above and below the plate 30′. The guide 107 is substantially semi-circular in cross section. In the event any fuel delivered by the spraying device 52ª′ remains in a liquid state when it reaches the lower end of the wall 44ª, the blades 53^b' will throw such liquid fuel outwardly through the nozzle 5^a as it drops below the wall 44^a and such liquid will engage the guide 107 and be conveyed thereby upwardly and delivered into the channel 106, where it will be acted on directly by the flame, and vaporized and ignited, supplementing to that extent the flame burning from the nozzle 5^a. As the guide 107 is in or immediately adjacent to the flame, it will be maintained at a relatively high degree of temperature so that any liquid fuel thrown against the guide will be vaporized and such vaporized fuel will be ignited by the flame as it passes through the annular slot or opening between the free upper edges of the guide 107 and flange 105; but in the event the fuel discharged against the guide 107 is not vaporized by the heat thereof, it will be discharged into the channel 106 where it will be acted upon directly by the flame. The guide 107 is preferably formed integrally with the wall 54' and connected by ribs or webs 108 with the plate 30'.
As the guide 107 extends below the plate 30' it will be seen that after the burner is operating, a portion of the conditioned fuel will be thrown against it and such fuel will be directed through the slot between the flange 105 and the upper end of the guide 107, where it will burn. As the flame from this fuel is directed toward the wall 44^a, it will serve to maintain the latter heated to a relatively high degree of temperature, to that extent supplementing the action of the flame from the nozzle 5^a.

38' indicates as an entirety a pilot device for igniting the fuel, whereby the burner may be set in operation. The form of construction shown in Figs. 13 and 14 for illustrative purposes comprises a gas supply pipe 109 extending to a point substantially above and between the channel 106 and trough 36^a which are arranged concentrically to and adjacent the inner and outer edges, respectively, of the nozzle 5^a. As shown in Fig. 13, the plates 29' and 30' are formed with aligned openings to receive the pipe 109. The pipe 109 delivers the gas into a substantially radial duct 110 formed in a thickened portion of the wall 30'. The opposite ends of the duct 110 serve as gas or pilot jets and ignite the fuel delivered into both the channel 106 and trough 36^a, it being understood that in starting up the burner, the blades 53^b' force the sprayed fuel against the guide 107 (as well as outwardly through the nozzle 5^a and into the trough 36^a) which delivers it into the channel 106. Accordingly, in this form of construction two igniting flames are provided, one around each edge of the nozzle 5^a.

Referring to Figs. 17 and 19, inclusive, 111 indicates a casing or housing having at one end an extended member 112 serving as a base for an electric motor 12^a. The casing 111 is preferably hollow, as shown in the drawings. The extended member 112 is provided with depending side walls 113 which engage the floor or other support on which the mechanism is mounted. 114 indicates a standard for supporting the other end of the casing. If desired, the extended member and the standard 114 may be provided with adjustable legs 115, 116, 117, each similar in construction to the legs already described in connection with Figs. 1 and 2, whereby the casing 111 may be arranged horizontally. The casing 111 is closed at its outer end by an end wall 119. The wall 119 is formed with an opening 120 through which a shaft 121 extends for connection (as indicated at 122) with the armature shaft of the motor 12^a. The inner end of the casing 111 is preferably closed by a wall 123. 123^a is an opening formed in the upper wall of the casing 111 near its inner end, the circumferential edge of the opening serving as a seat for a supplemental casing member 13^b of tubular shape and arranged vertically.

124 indicates a pipe for the fuel leading from a suitable source of supply (not shown). At 125, the pipe is provided with a valve, which is manually controlled, and at 126 the pipe is provided with a valve mechanism opened and closed by a solenoid which in turn, together with the motor 12^a, are controlled by a temperature controlled mechanism, which, if desired, may be of the construction already described in connection with the form of the invention shown in Fig. 1.
The pipe 124 leads through an opening formed in one wall of the extended member 112 (see Fig. 17) and then longitudinally of but preferably below the casing 111, being connected to a port 127 formed in the leg 114 and communicating at its inner end with a vertically arranged opening 128 also formed in the leg 114 in alignment with the axis of the casing member 13^b. 28^b indicates a pipe supported at its lower end in the opening 128 and arranged to supply fuel from the opening 128 to the burner members 129, 130, to be later referred to.

131 indicates a sleeve shaft surrounding the pipe 28^b and extending upwardly through the casing member 13^b and the inner burner member 129, and arranged to rotate a combined fuel receiver and spraying device 132 to be later referred to. The lower end of the shaft 131 is fitted within and secured in any suitable manner to the hub 133 of a bevel gear 134. The gear 134 is provided with a suitable recess to receive an antifriction bearing 135, the inner race of which is supported upon an annular boss 136 surrounding the pipe 28^b and formed integrally with the bottom wall of the casing or housing 111. 137 indicates a sleeve shaft surrounding the sleeve shaft 131 and extending upwardly through the casing member 13^b, preferably terminating at a point within the inner burner member 129. 138 indicates a bevel gear secured in any suitable manner to the lower end of the sleeve shaft 137. 139 indicates an anti-friction bearing interposed between the lower end of the sleeve shaft 137 and the sleeve shaft 131 to permit of rotative movements of one shaft relative to the other. 140 indicates a pair of nuts engaging screw threads provided upon the sleeve shaft 131 and serving as a shoulder or collar for the inner race of the bearing 139, and supporting through such bearing the sleeve shaft 137. 141 indicates a bevel gear meshing with the gears 138 and 134, whereby said gears and the shafts respectively connected thereto, are rotated in opposite directions. The gear 141 is connected to the inner end of the shaft 121, whereby the motor 12$^a$ drives the gear 141. The shaft 121 is preferably mounted at or near its opposite ends in anti-friction bearings 142, 142$^a$, which are supported in collars integrally formed with the walls of the housing 111. 143 indicates an anti-friction bearing arranged between the sleeve shaft 131 and sleeve shaft 137 near the upper end of the latter and operating to rotatively support the shaft 137 on the shaft 131. The inner wall of the shaft 137 is provided with an annular shoulder 137$^a$ which forms a seat for the bearing 143. 143$^a$ indicates a bushing mounted in a recess formed in the shaft 131 and rotatably fitting the pipe 28$^b$, it co-operating with the bushing 133 to support the shaft 131. As shown in the drawings, the bushing 143$^a$ and bearing 143 are disposed slightly below the lower open end of the inner member 129 and the nozzle of the burner, this arrangement preventing undue heating of the bearings at all times. 144 indicates an annular member surrounding the upper end of the sleeve shaft 137 and connected thereto by a series of arms or spokes 145. The annular member 144 serves as a support for the burner members 129, 130. The member 144 is shaped to form a seat for an annular boss 144$^a$ provided on the inner burner member 129.

The inner burner member 129 comprises a hollow device having a conical side wall 130$^a$ and an outwardly extending flange 130$^b$ around its lower edge. As shown, the lower portion of the wall 130$^a$ curves outwardly and the flange curves upwardly, so as to direct the fuel to be burned in a radial and upwardly inclined direction. 130$^c$ indicates a plurality of ribs or blades disposed radially of the side wall 130$^a$ and extending from end to end thereof and then radially of the flange 130$^b$, as shown at 130$^d$, to its circumferential edge. At the point of connection of the ribs 130$^c$ with the ribs 130$^d$, I provide an annular ring 145′ which co-operates with the outer edge of the flange 130$^b$ to form a nozzle or nozzle opening 130$^e$.

The outer member 130 preferably comprises a casing or shell which fits over and rests upon the outer side edges of the ribs or blades 130$^c$. As shown in Fig. 17$^a$, the lower free edge of the casing or shell 130 extends downwardly and overlaps the wall constituting the ring 130$^{e\prime}$. The side wall of the shell or casing 130 is spaced from the side wall of the inner member 129 by the ribs 130$^c$ and said side walls co-operate to form between the burner members 129, 130, a passage 146 for the fuel as it flows from the combined receiver and spraying device 132 to the nozzle or nozzle opening 130$^e$. By providing the annular ring 130$^{e\prime}$ and extending the side wall of the shell or casing 130 into engagement therewith, the passage 146 is extended to and around the ring 145′, so that the fuel is caused to flow radially through the nozzle opening 130$^e$.

The upper edge of the ring 130$^{e\prime}$ serves to collect any fuel which, flowing down the side wall of the shell 130, remains in liquid form and to prevent such fuel from flowing into and through the nozzle until it becomes vaporized.

Of the receiver and spraying device 132, 147 indicates a collar fitting over and having screw threaded connections with the upper end of the sleeve shaft 131. The upper end of the sleeve shaft 131 is preferably reduced to form a shoulder against which the collar 147 is tightened. 147′ indicates an annular, outwardly flaring wall extending upwardly from the collar 147 and connected to a wall 148 which extends over the free or discharge end of the pipe 28$^b$ and co-operates with the wall 147′ to form a chamber 147$^a$ into which the fuel is discharged from the pipe 28$^b$. The collar 147 and walls 147′, 148, are preferably formed integrally. The wall 148 preferably extends radially beyond the wall 147′ and terminates closely adjacent to the inner side wall of the burner member 130. 149 indicates a plurality of ducts or ports formed in the wall 147′ and uniformly spaced around the collar 147 for discharging the fuel from the chamber 147$^a$ in a downwardly inclined direction into the upper end of the passage 146. 150 indicates a plurality of blades extending radially of the collar 147 and uniformly spaced therearound, each being preferably arranged adjacent to one of the ducts 149. The plates terminate at their outer edges, relatively close and parallel to the upper ends of the ribs 130$^c$. Due to the rotation of the receiver and spraying device 132 by the shaft 131, it will be seen that the fuel is thrown outwardly and downwardly in relatively fine streams by the ducts 149 and that the blades 150 by reason of their co-action with the blades 130$^c$ serve to break the fuel up into spray form and to discharge it centrifugally against the inner surface of the side wall of the outer member 130, whereby the fuel will be readily vaporized as it flows through the passage 146. As shown in the drawings, the blades 150 occupy all the space between the wall 147' and extended portions of the wall 148 and the upper ends of the inner burner member 129 and ribs 130ᶜ secured thereto. As a result of this construction, the blades operate as a pump, to draw air up through the inner member 129 and discharge the air into the upper end of the passage 146, whereby the air may mix with the fuel as it vaporizes, to condition the fuel for ignition or burning from the nozzle 130ᵉ.

151 indicates a device adjustably supported upon the sleeve shaft 137 and arranged to control the lower end of the opening extending into and through the inner member 129. The device 151 comprises an annular plate, having a hub fitting the sleeve shaft 137. The hub of the device 151 and the outer wall of the sleeve shaft 137 are provided with screw threads, whereby the rotation of the device 151 about the sleeve shaft 137 will cause it to move endwise thereof to move the plate toward and from the opening defined by the ring 144 leading into the inner member. The device 151 is preferably provided with one or more lugs 152, by means of which it may be rotated.

153 indicates a trough surrounding the nozzle 130ᵉ. The trough is supported by a plurality of brackets or arms 154 which are connected at their inner ends to a collar 155. The collar 155 adjustably fits the upper end of the casing member 13ᵇ and may be secured thereto in its adjusted position by a set screw 156. The trough 153 may be provided throughout its circumference with a quantity of asbestos or other suitable material, which will absorb the liquid fuel supplied to it through the burner and nozzle in starting the burner, and such fuel may be ignited by a suitable pilot device indicated as an entirety at 157. The pilot device 157 may be of the form of construction shown in Figs. 17 and 17ᵃ, or such pilot device may be of some other suitable form of construction, as already set forth herein in connection with the construction illustrated in Figs. 1 to 8, inclusive.

158 indicates a conveying device extending into the supply pipe 28ᵇ from its discharge end and serving to cause the discharge from the upper end of said pipe of a substantially uniform quantity of fuel while the burner is in operation. The conveying device 158 may also be used to feed the fuel into the receiver where the source of supply is arranged below the discharge end of the pipe 28ᵇ. The conveying device 158 preferably comprises a spiral web which rotatably fits within the upper end of the pipe 28ᵇ. The upper or free end of the conveying device 158 is provided with screw threads and such screw threaded end fits into a screw threaded opening formed in the wall 148 of the spraying device 132, such construction serving to connect the conveying device 158 to the spraying device 132, whereby said conveying device 158 will be rotated by the spraying device to effect the feeding and discharge of the fuel into the chamber 147ᵃ. 158 indicates a cap having screw threaded engagement with the upper end of the pipe 28ᵇ and fitting over the free end of the sleeve shaft 131, to close the upper end of the latter and prevent the fuel from flowing down between the pipe 28ᵇ and the shaft 131.

The gears 134, 138 and 141, as well as the bearings 142, 142ᵃ, are lubricated by the lubricant which is maintained at a suitable height within the casing 111, the latter being shaped and formed to hold sufficient lubricant for this purpose. To lubricate the bearing 143 and bushing 143ᵃ, I provide the outer wall of the pipe 28ᵇ with a spiral groove 160, which extends from a point within the casing 111 to a point above the bushing 143ᵃ. The lubricant is caused to flow through said groove by reason of the rotation of the shaft 131 in a well known way and as already described herein.

At a point above the bushing 143ᵃ, the sleeve shaft is formed with a plurality of ducts 161 through which the lubricant, conveyed upwardly by the spiral groove 160, is discharged into the space surrounding the shaft 131 so that it may flow into and through the bearing 143. The lubricant supplied to the bearing 143 may flow downwardly between the shafts 131, 137, through the bearing 139 and back into the casing 111. 162 indicates an opening formed in the inner end wall of the housing 111, such opening being screw threaded and closed by a suitable plug 163.

151' indicates as an entirety means for preventing pre-ignition in the nozzle 130ᵉ or between the inner and outer burner members 129, 130, and for maintaining the ignition of the fuel at or beyond a predetermined point. The means 151' may comprise an annular member or wall 151ᵃ bridging the nozzle opening 130ᵉ and formed with a series of slits 151ᵇ through which the conditioned fuel flows, the slits 151ᵇ being uniformly spaced around the member 151ᵃ. The wall 151ᵃ is preferably formed integrally with the flange 130ᵇ and ring 145'.

In starting the burner in the construction last described, upon the opening of the valve in the supply pipe 124, the fuel flows therethrough and through the pipe 28ᵇ, from which it is discharged into the chamber 147ᵃ. From the chamber 147ᵃ the fuel is discharged in spray condition centrifugally into the passage 146. The sprayed fuel flows down the passage 146 and is thrown centrifugally outwardly through the nozzle 130ᵉ by the blades 130ᵈ. This fuel or a portion thereof will fall into the trough 153 where it will be ignited by the pilot 157. The flame in the trough will in turn ignite the fuel being discharged from the nozzle 130ᵉ. The flame from the nozzle will operate to heat the side wall of the outer burner member 130. When the wall is sufficiently heated, the fuel which is being sprayed against the inner surface of the wall will become vaporized. In this form of construction all of the air to be mixed with the vaporized fuel is supplied through the inner member 129 into the upper end of the passage 146, it being pumped thereinto by the blades 150. As will be understood from the foregoing description the inner and outer burner members 129, 130, are rotated; accordingly, the liquid will be acted on centrifugally to maintain it against the inner surface of the outer side wall as it flows downwardly through the passage 146; whereas the blades 130ᵈ will serve to discharge the conditioned fuel under pressure outwardly from the nozzle 130ᵉ.

Referring to Figs. 20 to 24, inclusive, 164 indicates a casing having at its outer end a depending section 165, to support such end and provide a base 166 for an electric motor 12ᶜ.

167 indicates a fuel supply pipe leading from a source of supply (not shown). It will be understood that the supply of fuel through the pipe 167 and the current for the motor 12ᶜ may be and preferably is controlled by mechanism, such as indicated at 68 in Fig. 1. 168 indicates a casing section arranged at the inner end of the casing 164 and shaped to house a blower 169 of suitable construction for pumping air to the inner and outer burner members 170, 171, respectively; the end wall of the casing being open (see Fig. 22) to permit air to be drawn in. The end wall of the casing section is provided with a spider 172 having a seat for a bearing 173. The bearing 173 supports the inner end of a shaft 174, which is connected to and operates the blower. The shaft 174 extends through the casing 164, where it is connected at 175 with the armature shaft of the motor 12ᶜ. The casing section 168 is shaped to form a chamber 176 around the blower, the walls of the chamber terminating into a conduit 177 which is connected at its upper end with the inner burner member 170. The upper end walls of the conduit are disposed horizontally to form a seat or support for the burner members 170, 171.

The supply pipe 167 leads to a chamber 178, the walls of which are preferably formed integrally with the casing 164. 179 indicates a pipe leading from the chamber 178 to a conduit 180 leading through the casing section 164 (see Fig. 23). The conduit 180 extends upwardly around the adjacent wall of the blower 169 and is connected to the lower end of a pipe 181 to deliver the fuel thereto. The pipe 181 extends upwardly into and through the inner burner member 170 and supplies the fuel to the upper end of the passage or space 182 between the burner members 170, 171.

The inner burner member 170 comprises a conically shaped hollow side wall 170ᵃ having an outwardly extending flange 170ᵇ around its lower edge. The outer portion of the flange is preferably curved or bent upwardly. The flange 170ᵇ is preferably secured in any desired manner to the end wall of the conduit 177. 183 indicates a plurality of ribs or blades disposed radially of the side wall 170ᵃ of the inner burner member 170 extending from end to end thereof and then radially of the flange 170ᵇ, as shown at 183ᵃ, to its circumferential edge. At the connection of the ribs 183 with the ribs 183ᵃ, I provide an annular ring 184, which co-operates with the outer edge of the flange 170ᵇ to form a nozzle or nozzle opening 171ᵃ. The ring 184 is shaped to form a seat for the lower edge of the side wall for the outer burner member 171. The inner portion of the ring 184 is disposed against the inner wall of the outer member so that the upper circumferential edge of the ring 184 will serve to arrest the downward flow along such wall of any fuel which during operation of the burner has not been vaporized to prevent it from being discharged from the nozzle. The edge therefore serves to collect such liquid fuel and hold it until it is vaporized by the heat of the wall of the outer member.

The outer burner member 171 preferably comprises a casing or shell, which fits over and rests upon the outer side edges of the ribs 183, with its lower free edge engaging the ring 184. The casing or shell 171 cooperates with the side wall 170ᵃ of the inner member 170 to form the passage 182 from the upper end of the latter to a point within or behind the nozzle opening 171ᵃ.

From the foregoing description it will be seen that the burner members are arranged within the nozzle 171ᵃ and project upwardly beyond the latter so that the side wall of the outer member will be heated by the flame burning from the nozzle 171ᵃ, and thus cause vaporization of the fuel delivered to the upper end of the passage 182.

The upper end of the inner burner member 170 is provided with a spider 185, which permits the air supplied by the conduit 177 to flow to the space or passage 182. The central portion of the spider is provided with a hub or collar 186 that receives the upper end of the pipe 181, this arrangement serving to support the upper end of the burner member 170. The spider 185, wall 170ᵃ, ribs 183, 183ᵃ, flange 170ᵇ and ring 184 are preferably formed integrally. As the inner member 170 is hollow, it serves as a conduit for the air forced through the conduit 177 to deliver it to the upper end of the passage 182 between the burner members 170, 171, whereby the air may mix with the fuel as it is vaporized and before it is discharged from the nozzle 171ª.

187 indicates a rotatable device arranged at the uper end of the inner member 170 for breaking up the fuel delivered by the pipe 181 and spraying it against the inner surface of the side wall of the outer member 171. The device 187 preferably comprises a hub 187ª and a web 187ᵇ from which extend in a radial direction a plurality of blades 188. The hub is shaped to permit the provision of an anti-friction bearing 189 between it and the pipe 181, whereby the spraying device may be easily rotated. The blades 188 are preferably inclined to the vertical or curved in cross section, so that the current of the air which is being forced through the inner burner member 170 into the passage 182, will cause the device to rotate; or if desired, the spraying device 187 may be geared and mechanically driven by the blower shaft in any well known way. As the blades 188 extend to a point relatively close to the upper ends of the ribs 183, the relative movement between the blades 188 and ribs 183, as the fuel is discharged into the passage 182, will effect a spraying action upon the fuel.

190 indicates means for preventing pre-ignition of the fuel in the nozzle 171ª or between the inner and outer burner members 170, 171, and maintaining the ignition of the fuel at or beyond a predetermined point. The means 190 may comprise an annular wall 191 bridging the nozzle opening 171ª, preferably of convexed shape and formed with slits 192 spaced from each other throughout the circumference of the wall 191. The wall 191 is preferably formed integrally with the flange 170ᵇ and ring 184.

The inner and outer burner members 170, 171, disclosed in Figs. 20 to 24, inclusive, are stationary. The fuel is sprayed into the passage 182 by the rotatable device 187. To provide for the mixing of the air with the vaporized fuel I utilize a blower which forces the air through or between the burner members, and insures the conditioning of the fuel and its discharge from the nozzle 171ª. To simplify the construction, I utilized the flow of the air supplied for mixing with the fuel to rotate the spraying device 187.

In Figs. 25 and 26, I have shown a further modified form of fuel burning mechanism. In these views 13ᶜ indicates a supplemental casing member arranged to be supported upon a housing (a portion only of which is shown) such as is hereinbefore described. 28ᵈ indicates the pipe, through which fuel is supplied to the mechanism, leading upwardly through the casing member 13ᶜ, 29ᶜ, 29ᶜ′, indicate the outer and inner burner members, respectively; the latter member being constructed substantially similar to the inner member shown in Figs. 12 to 15, inclusive, except that at a point near their lower ends the blade sections 53ª′ are formed with recesses extending inwardly from their outer edges, as indicated at 192′, the purpose of which recesses will be later set forth. 193 indicates an annular plate seated on the upper end of the casing section 13ᶜ and provided with an extension 195 which co-operates with a plate 194 spaced from it to form a nozzle 5ᶜ. The extended portion 195 of the annular plate 193 is preferably curved upwardly.

195′ indicates means for preventing pre-ignition of the fuel before it reaches the nozzle opening and for maintaining the ignition of the conditioned fuel at or beyond the nozzle opening. The means 195′ may comprise a convex wall 195ª similar to the wall 54 already described, and such wall may be formed with slits 195ᵇ arranged similarly to the slits 54ᵇ also described herein.

The outer member 29ᶜ, is substantially of the same construction as the member 29ᵇ′ already described, except that it is constructed in two sections 197, 198, which may be detachably connected together in the manner about to be described. The section 197 is preferably formed integrally with the plate 194, and is thickened so as to provide a seat 199 for a ring 200 preferably formed integrally with and extending around the lower free edges of the ribs 198ª provided on the outer surface of the outer member section 198. As clearly shown in Fig. 27, the portions of the ribs disposed within the ring 200 are cut away, as shown at 201, so as to form a recess or space between the lower circumferential edge of the outer member section 198 and the upper surface of the inner member section 197, which recess aligns with the recesses 192′ formed in the ribs 53ª′.

202 indicates an annular member mounted in the recesses 192′ formed in the ribs 53ª′ and extending laterally across the space between the outer edges of the ribs 53ª′ and the wall of the outer member 29ᶜ into the space or recess 201 formed between sections 197, 198. The annular member 202 preferably comprises a relatively thin continuous ring, which may be formed of sheet metal, secured to the inner member in any desired manner as indicated as an entirety at 203. The securing means 203 preferably comprises a plurality of lugs 204, each of which is disposed at one side of a rib 53ª′ so that in the rotation of the inner member about the supply pipe 28ᵈ, the ribs will engage the lugs and prevent the displacement of the ring. To hold the lugs in engagement with the ribs, I may offset the metal of the ring 202 slightly as shown at 205, to form a resilient stop or abutment to prevent relative movement between the ring and ribs in a direction away from the lugs.

Intermediate the ribs 53ª′, the ring 202 is cut away, as shown at 206, such cutaway portions extending radially to a point slightly greater than the distance of the outer edge of the ribs 53ᵃ′ from the axis of the inner member, to permit the ready assembly of the ring 202. In assemblying the ring 202 in position, the cutaway portions are arranged in alignment with the ribs 53ᵃ′; the ring is then positioned over the inner member and slid down to a point where it is in the plane of the recesses 192′; the ring 202 is then rotated, causing the ribs to ride the projections or stops 205 to bring the lugs 204 into engagement with the ribs. After the ring 202 is secured to the inner member, it rotates therewith relative to the outer member. The walls of the outer member sections forming the recess 201, are spaced to permit the ring to rotate therein freely, but in carrying out the objects of my invention, the clearance between the surfaces of the ring and the walls of the recess 201 is relatively small, preferably of a size small enough to prevent pre-ignition of the fuel through the space between the ring 202 and the walls of the recess 201 through which the ring moves.

The purposes of the ring 202 will be later set forth. 207 indicates a wall projecting upwardly from the plate 194, and extending circumferentially thereof around its outer edge. The wall 207 co-operates with the upper surface of the plate 194 and outer wall of the burner member section 197 to form a channel or trough 208 into which the liquid fuel is directed for burning purposes in the manner to be set forth and for igniting the nozzle 5ᶜ. As shown in Figs. 25 and 26, the wall 195 is extended and shaped to provide an annular channel or trough 208ᵃ around the nozzle 5ᶜ and this channel or trough 208ᵃ may be filled with a quantity of asbestos or other suitable material 209, capable of absorbing the liquid fuel, whereby the latter may be readily ignited and burned.

The purposes of the ring 202 are threefold: first, when the burner is started by supplying to it fuel and rotating the inner member, such fuel is sprayed and maintained centrifugally in the manner already described in connection with other forms of my invention, against the inner surface of the outer member 29ᶜ; as the fuel flows downwardly along such wall, it engages with and is arrested by the upper surface of the ring 202, whereupon it is thrown outwardly by the centrifugal action of the blades 53ᵃ′ and ring 202 into the trough or channel 208, where it is ignited by the pilot device 210, preferably constructed in the manner already described herein. This liquid fuel will continue to burn in the channel or trough 208 until the walls of the outer member 29ᶜ become heated sufficiently to vaporize the fuel flowing through the passage between the outer and inner members. When this condition exists, the vaporized fuel, not being acted upon by the centrifugal action of the blades 53ᵃ′ and ring 202, will flow downwardly through the space between the inner circumferential edge of the ring 202 and the outer wall of the inner member 29ᶜ′ into the space between the annular member 193 and plate 194, where the blade sections 53ᵃ′ will effect a mixture of the air and vaporized fuel to completely condition the latter and eject it through the nozzle; second, following the operation of starting the burner after the outer member 29ᶜ has become heated to cause vaporization of the fuel, the ring 202 will continue to collect and arrest the further flow downwardly of any fuel which remains in the liquid form, so that the centrifugal action of the blades and ring will cause it to be ejected through the recess 201 into the channel or trough 208 where it may be burned, thereby preventing the liquid fuel from flowing downwardly into the nozzle; this construction and operation being particularly advantageous since, in preventing the flow and discharge of liquid fluid through the nozzle the possibility of carbon accumulating in the nozzle or in the slits 195ᵇ of the wall 195ᵃ, thereby stopping up of the latter, is eliminated; third, the ring 202 also serves to collect carbon which may be scraped from the inner wall of the outer member 29ᶜ by the rotating ribs 53ᵃ′, and permits the latter to throw such carbon outwardly by reason of the centrifugal action of the blades and ring 202 through the recess 201 formed between the sections 197 and 198. This carbon will be thrown into the channel 208 and consumed by the flame therein, if the channel or trough is in operation; otherwise such carbon will accumulate in the material in the trough and be consumed at the time the burner is next set in operation. In order that the carbon may be broken up or ground into powder form, I preferably provide the upper surface of the ring 202 with grooves or serrations 202ᵃ to form a grinding surface which coacts with the lower edge of the member section 198 to grind the carbon particles into dust or powder form, whereby the carbon may be readily consumed and permitted to pass readily through the space between the ring and the lower edge of the section 198.

It will be seen that each of the fuel burning mechanisms embodying my invention may be easily manufactured and assembled. It will also be seen that each of the arrangements disclosed permits of an adequate supply of air and a continuous uniform mixture of the vaporized fuel and air to insure a properly conditioned fuel.

In my construction I provide both for the complete vaporization and for mixture of air in proper proportions with the vaporized fuel at a point within the burner members or behind the nozzle opening, so that when the fuel which is to be burned is discharged from the nozzle it is completely conditioned to effect complete combustion. As set forth above, the burner members between which the fuel is conducted and vaporized and air is mixed with the vaporized fuel, are so disposed relative to the nozzle that the wall of the outer member is in the zone of the flame burning from the nozzle.

In my constructions I have provided a fuel passage in close proximity or juxtaposition to the flame of the burner to insure quick and complete vaporization. I spray the fuel into such passage and against the wall which is exposed to the flame. In each of the embodiments disclosed (except one) I maintain the sprayed fuel in contact with the heated wall by centrifugal action throughout the length of the passage or until the fuel is vaporized. In each of my constructions I have provided means for forcing the air into contact and intimate mixture with the vaporized fuel, thereby effecting a properly proportioned mixture of the vapor and air.

My invention may be advantageously employed for heating purposes, particularly where it is desired to maintain a substantially uniform temperature, since it may be lighted, shut off and re-lighted automatically as herein set forth.

The construction permits cold air to be supplied directly into and circulated through the inner burner member to its outer end and then into the space between the inner and outer members. This operation maintains the burner members and other elements thereof and the bearings for the rotating elements relatively cool, thereby providing for proper operation and long use of these elements.

To those skilled in the art to which my invention relates many alterations in construction and widely differing embodiments and applications of the invention will suggest themselves without departing from the spirit and scope thereof. My description and disclosures herein are purely illustrative and are not intended to be in any sense limiting.

What I claim is:

1. In apparatus of the class described, the combination of a hollow member closed at one end, a nozzle surrounding the other end of said member and opening in an outward direction, a second hollow member within said first mentioned member and cooperating therewith to form a passage between them leading to said nozzle, means for supplying air to the inlet end of said passage, and means for conducting fuel through said last mentioned member to the inlet end of the passage and distributing it against the inner wall of the first mentioned member.

2. An apparatus as claimed in claim 1 in which the means for distributing the fuel against the inner wall of said first mentioned member operates centrifugally.

3. In apparatus of the class described, the combination of a hollow member closed at one end, a nozzle surrounding the other end of said member and opening in an outward direction, a second hollow member within said first mentioned member and co-operating therewith to form a passage between them leading to said nozzle, means for conducting fuel and air through said last mentioned member to the inlet end of said passage, and centrifugal means for throwing the fuel against the inner wall of said first mentioned member.

4. An apparatus as claimed in claim 3, in which said centrifugal means operates to throw the fuel against the inner surface of said member at a point remote from the nozzle.

5. In a fuel burning mechanism, the combination of an annular nozzle, a pair of hollow members one arranged within the other to form a fuel passage between them leading to said nozzle, said members being surrounded by said nozzle whereby the outer member is heated by the flame burning from said nozzle, the end of said outer member remote from said nozle being closed, means for conducting fuel and air through said inner member into the inlet end of said passage, and means for distributing the fuel against the inner surface of said outer member at a point remote from the nozzle.

6. In a fuel burning mechanism, the combination of an annular nozzle, hollow members, one within the other and forming between them a fuel passage leading to said nozzle, the outer member having a closed end arranged within the circumference of said nozzle and projecting into the zone within the flame burning from said nozzle to be heated thereby, and means for conducting the fuel and air through said inner member to said passage at a point remote from said nozzle and for distributing the fuel against the inner surface of said outer member.

7. An apparatus as claimed in claim 6 in which the distributing means centrifugally discharges the fuel against the inner surface of said member.

8. An apparatus as claimed in claim 5 in which are provided separate means for distributing the fuel against the inner surface of said outer member as it flows toward said nozzle.

9. In a fuel burning mechanism, the combination of an annular nozzle, hollow members, one arranged within the other and forming between them a fuel passage leading to said nozzle, the outer member having a closed outer end arranged within said nozzle and projecting into the zone of the flame burning from said nozzle to be heated thereby, a rotatable receiver having its delivery end associated with the inlet end of said passage, means for supplying through said inner member fuel to said receiver and air to said passage, and means for rotating said receiver.

10. In apparatus of the class described, the combination of an annular nozzle, a pair of members one arranged within the other and correlated to form between them a passage leading to said nozzle, said outer member being arranged within the zone of the flame burning from said nozzle, whereby said outer member is heated, means for supplying fuel and air to the passage at a point remote from its discharge end, means for mixing the air with the fuel as it flows through said passage, and means for supplying additional air into said nozzle for mixture with the fuel flowing therethrough prior to its discharge from said nozzle.

11. In apparatus of the class described, the combination of a plurality of members one arranged within the other and correlated to form a passage between them, a nozzle surrounding and projecting substantially radially of said outer member and arranged adjacent to one edge thereof to receive fuel flowing from the passage and discharge it into the space around said members, means for supplying fuel into the passage, means for supplying air into said passage for mixture with the fuel before its discharge from the opening of said nozzle, and means bridging the nozzle opening for preventing pre-ignition of the fuel.

12. In apparatus of the class described, the combination of a plurality of members one arranged within the other and correlated to form a passage between them, a nozzle surrounding and projecting substantially radially of said outer member and arranged adjacent to one edge thereof to receive fuel flowing from the passage and discharge it into the space around said members, means for supplying fuel to the passage at a point remote from said nozzle, means for supplying air into said passage for mixture with the fuel before its discharge from the opening of said nozzle, and means bridging the nozzle opening for preventing pre-ignition of the fuel, said means comprising a wall formed with slits through which the fuel and air pass.

13. In apparatus of the class described, the combination of a pair of members, one arranged within the other and correlated to form a passage between them, a nozzle surrounding and projecting substantially radially of said outer member and arranged adjacent to one edge thereof to receive the fuel flowing from the passage, whereby the flame from said nozzle is projected into the space around said member to effect vaporization of the fuel within the passage, means for supplying and spraying substantially radially fuel into the passage at a point remote from said nozzle, and means for supplying air into said nozzle for mixture with the vaporized fuel before it is discharged from said nozzle.

14. In apparatus of the class described, the combination of a pair of members, one arranged within the other and correlated to form a passage between them, a nozzle surrounding and projecting substantially radially of said outer member and arranged adjacent to one edge thereof to receive the fuel flowing from the passage, whereby the flame from said nozzle is projected into the space around said members, means for supplying and centrifugally spraying fuel into the passage at a point remote from said nozzle, and radially disposed spaced ribs extending across the space between said members.

15. In apparatus of the class described, the combination of a pair of members, one arranged within the other and correlated to form a passage between them, a nozzle surrounding and projecting substantially radially of said outer member and arranged adjacent to one edge thereof to receive the fuel flowing from the passage, whereby the flame from said nozzle is projected into the space around said members, means for supplying and spraying substantially radially fuel into the passage at a point remote from said nozzle, and means acting on the fuel to distribute it against the inner surface of the outer member as it flows through said passage until it is vaporized.

16. In apparatus of the class described, the combination of a pair of members, one arranged within the other and correlated to form a passage between them, a nozzle surrounding and projecting substantially radially of the outer member and arranged adjacent to one edge thereof to receive the fuel flowing from the passage, whereby the flame from said nozzle is projected into the space around said members, means for supplying air and fuel through said inner member into said passage, a device connected to and movable with said inner member for spraying the fuel into the passage against the inner wall of said outer member at a point remote from said nozzle, means on said inner member for mixing the sprayed fuel and air in said passage, and means for rotating said inner member.

17. In apparatus of the class described, the combination of a pair of members, one arranged within the other and correlated to form a passage between them, a nozzle surrounding and projecting substantially radially of the outer member and arranged adjacent to one edge thereof to receive the fuel flowing from the passage, whereby the flame from said nozzle is projected into the space around said members, means for supplying and spraying fuel into the passage at a point remote from said nozzle, means for rotating said inner member, and means carried by said inner member for scraping off carbon which may accumulate on the inner wall of said outer member.

18. In apparatus of the class described, the combination of a pair of members, one arranged within the other and correlated to form a passage between them, a nozzle surrounding and projecting substantially radially of the outer member and arranged adjacent to one edge thereof to receive the fuel flowing from the passage, whereby the flame from said nozzle is projected into the space around said members, means for supplying and spraying fuel into the passage at a point remote from said nozzle, means for rotating said inner member, and means carried by said inner member for distributing the fuel against the inner surface of the outer member until it is vaporized and for scraping off carbon which may accumulate on the inner wall of said outer member.

19. In apparatus of the class described, the combination of a pair of members, one arranged within the other and correlated to form a passage between them, a nozzle surrounding and projecting substantially radially of the outer member and arranged adjacent to one edge thereof to receive the fuel flowing from the passage, whereby the flame from said nozzle is projected into the space around said members, means for supplying and spraying fuel into the passage at a point remote from said nozzle, means for rotating said inner member, and radially disposed spaced ribs carried by and extending longitudinally of said inner member and operating centrifugally to distribute the fuel against the inner surface of the outer member until it is vaporized and arranged to scrape therefrom carbon that may accumulate on the inner wall of said outer member.

20. In apparatus of the class described, the combination of a nozzle, a vaporizing chamber having a side wall and a closed end and arranged within the zone of the flame from said nozzle so that said side wall of the chamber may be heated by the flame, the opposite end of said chamber opening downward below said nozzle, means for conducting fuel through the open end of said chamber and spraying it against the heated wall of said chamber, whereby the fuel is vaporized, means for ejecting the vaporized fuel through said nozzle, and means for removing carbon from the inner surface of said side wall.

21. In apparatus of the class described, a nozzle, a pair of members forming between them a passage leading to said nozzle, the outer member being arranged within the zone of the flame from said nozzle so that its wall may be heated by the flame, means for spraying liquid fuel against the heated wall to vaporize the fuel, means for mixing air with the vaporized fuel, means for ejecting the mixed air and vaporized fuel through said nozzle, means adjacent said nozzle opening for preventing the ignition of the mixture until same had been ejected from said nozzle, and means for removing carbon deposits from the inner surface of said heated wall.

22. In apparatus of the class described, the combination of inner and outer concentrically arranged members correlated to form a fuel passage between them, a nozzle connected to one end of said fuel passage, a spraying device rotatably mounted in position to spray the fuel into the other end of said fuel passage, means for supplying fuel through the inner member to said spraying device, means for supplying air through said inner member for mixture with the sprayed fuel and means for rotating said spraying device.

23. In apparatus of the class described, the combination of a pair of cylindrical members, one arranged within the other and correlated to form a fuel passage between them, a flange surrounding one end of the inner member extending outwardly and co-operating with the adjacent end of the outer member to form a nozzle, radially disposed ribs uniformly spaced around the inner member and extending longitudinally of said passage, a rotatable spraying device arranged to spray the fuel into that end of the passage remote from said nozzle, and means for rotating said device.

24. In apparatus of the class described, the combination of an annular nozzle, inner and outer concentrically arranged members correlated to form between them a fuel passage connected at one end with said nozzle and projecting into the zone of the flame therefrom, a plurality of radially disposed ribs carried by the inner member, means for supplying fuel through said inner member to the other end of said fuel passage, means for rotating said inner member, and a device movable with said inner member for spraying and discharging the fuel into said passage.

25. In apparatus of the class described, the combination of inner and outer concentrically arranged members correlated to form a fuel passage between them, a nozzle connected to one end of said fuel passage, a spraying device rotatably mounted between said members in position to spray the fuel into the other end of said fuel passage, said device being formed in its wall with a discharge duct, means for supplying fuel through said inner member to said spraying device, and means for rotating said spraying device.

26. In apparatus of the class described, the combination of inner and outer members correlated to form a fuel passage between them, a nozzle surrounding said members and connected to the fuel passage at one end thereof, a pipe for supplying fuel through said inner member into said passage, a sleeve surrounding said supply pipe and connected to said inner member, a bearing between the upper end of said sleeve and said pipe, and means for rotating said sleeve.

27. In apparatus of the class described, the combination of a tubular housing, an annular member supported on said housing, an annular plate spaced from said member and correlated therewith to form an annular nozzle, a cup member supported on said annular plate within the zone of the flame burning from said nozzle so as to be heated thereby, a cylindrical member arranged within and correlated with said cup member to form a fuel passage, a fan, the blades of which traverse the space between said annular member and said annular plate, and means for rotating said fan.

28. In apparatus of the class described, the combination of a tubular housing, an annular member supported on said housing, an annular plate spaced from said member and correlated therewith to form an annular nozzle, a cup member supported on said annular plate, a cylindrical member arranged within and correlated with said cup member to form a fuel passage, radially disposed blades carried by said inner member and having sections which traverse the space constituting the fuel passage and sections which traverse the space within the nozzle, and means for rotating said inner member.

29. In apparatus of the class described, the combination of a tubular housing, an annular member supported on said housing, an annular plate spaced from said member and correlated therewith to form an annular nozzle, a cup member supported on said annular plate, a cylindrical member arranged within and correlated with said cup member to form a fuel passage, radially disposed blades carried by said inner member and having sections which traverse the space constituting the fuel passage and sections which traverse the space within the nozzle, and means for rotating said inner member, the blade sections which traverse the fuel space extending into close proximity to the inner wall of said cup member and serving to scrape carbon deposits therefrom.

30. In apparatus of the class described, the combination of a hollow section, inner and outer members correlated to form a fuel passage between them, a nozzle surrounding said members and section and connected at its inner end thereto, whereby it receives fuel from said fuel passage and air from said section, a fan traversing the space inwardly of the discharge end of said nozzle, and means for rotating said fan.

31. In apparatus of the class described, the combination of a hollow section, inner and outer members correlated to form a fuel passage between them, a nozzle surrounding said members and section and connected at its inner end thereto, whereby it receives fuel from said fuel passage and air from said section, blades carried by one of said members and traversing the space inwardly of the discharge end of said nozzle and means for rotating the member carrying said blades.

32. In apparatus of the class described, the combination of a hollow section, inner and outer members correlated to form a fuel passage between them, a nozzle surrounding said members and section and connected at its inner end thereto, whereby it receives fuel from said fuel passage and air from said section, blades carried by said inner member and traversing the space inwardly of the discharge end of said nozzle, and means for rotating said inner member.

33. In an apparatus of the class described, the combination of a hollow section, inner and outer members correlated to form a fuel passage between them, a nozzle surrounding said members and section and connected at its inner end thereto so as to receive fuel from said passage and air from said section, whereby the fuel is conditioned for ignition within said nozzle, and means for preventing pre-ignition of the conditioned fuel in said nozzle.

34. In an apparatus of the class described, the combination of a hollow section, inner and outer members correlated to form a fuel passage between them, a nozzle surrounding said members and section and connected thereto so as to receive fuel from said passage and air from said section, whereby the fuel is conditioned for ignition within said nozzle, and means for preventing pre-ignition of the conditioned fuel in said nozzle, said means comprising a wall bridging the nozzle opening and formed with a plurality of relatively small openings.

35. In an apparatus of the class described, the combination of a hollow section, inner and outer members correlated to form a fuel passage between them, a nozzle surrounding said members and section and arranged to receive fuel from said passage and air from said section, whereby the fuel is conditioned for ignition within said nozzle, and means for preventing pre-ignition of the conditioned fuel in said nozzle, said means comprising a wall bridging the nozzle opening and formed with a plurality of relatively small tangential slits.

36. In apparatus of the class described, the combination of a hollow section, inner and outer members correlated to form a fuel passage between them, a nozzle surrounding corresponding ends of said members and adjacent end of said section and connected thereto so as to receive fuel from said fuel passage and air from said section, a fan traversing the space inwardly of the discharge opening of said nozzle and arranged to mix the air and fuel flowing from said section and passage, respectively, and discharge such mixture from the nozzle opening, and means for rotating said fan.

37. In apparatus of the class described, the combination of a hollow section, inner and outer members correlated to form a fuel passage between them, a nozzle surrounding and connected to corresponding ends of said members and adjacent end of said section and so as to receive fuel and air therefrom, respectively, a fan connected to one of said members and traversing the space inwardly of the discharge opening of said nozzle and arranged to mix the air and fuel flowing from said section and passage, respectively, and discharge such mixture from the nozzle opening, and means for rotating the member to which said fan is connected.

38. In apparatus of the class described, the combination of a hollow section, inner and outer members correlated to form a fuel passage between them, a nozzle surrounding and connected to said members and adjacent end of said section so as to receive fuel from said fuel passage and air from said section, a fan connected to said inner member and traversing the space inwardly of the discharge opening of said nozzle and arranged to mix the air and fuel received from said section and passage and discharge it from the nozzle opening, and means for rotating said inner member.

39. In apparatus of the class described, the combination of a hollow section, inner and outer members correlated to form a fuel passage between them, a nozzle surrounding and connected to said members and the adjacent end of said section so as to receive fuel from said fuel passage and air from said section, means for supplying fuel into said passage, said inner member being hollow and communicating at one end with said hollow section and at its opposite end communicating with said fuel passage, whereby air flows through it into the fuel passage for mixture with the fuel, a fan connected to one of said members and traversing the space inwardly of the discharge opening of said nozzle and arranged to mix the air and fuel received from said section and fuel passage, respectively, and discharge it from the nozzle opening, and means for rotating the member to which said fan is connected.

40. In apparatus of the class described, the combination of a hollow section, inner and outer members correlated to form a fuel passage between them, a nozzle surrounding and connected to said members and the adjacent end of said section so as to receive fuel from said fuel passage and air from said section, means for supplying fuel for delivery into the fuel passage, means for spraying the fuel as it is delivered into the fuel passage, said inner member being hollow and communicating with said hollow section at one end and with said fuel passage at its other end, whereby air flows through it into the fuel passage for mixture with the fuel, a fan connected to one of said members and traversing the space inwardly of the discharge opening of said nozzle and arranged to mix the air and fuel received from said section and fuel passage, respectively, and discharge it from the nozzle opening, and means for rotating the member to which said fan is connected.

41. In apparatus of the class described, the combination of a pair of annular members spaced to form around their outer edges a nozzle, inner and outer annular walls correlated to form between them a fuel passage opening at one end into said nozzle, the outer wall being connected along one edge to one wall of said nozzle and extending therefrom into the zone of the flame burning from said nozzle to be heated thereby, means for supplying fuel through said inner member to the opposite end of said fuel passage, and means for discharging the fuel against the inner surface of said outer wall.

42. In apparatus of the class described, the combination of a pair of annular members spaced to form around their outer edges a nozzle, inner and outer annular walls correlated to form between them a fuel passage opening at one end into said nozzle, the outer wall being connected along one edge to one wall of said nozzle and extending therefrom into the zone of the flame burning from said nozzle to be heated thereby, means for supplying fuel through said inner member to the opposite end of said fuel passage, means for discharging the fuel against the inner surface of said outer wall, and separate means for distributing the fuel against the inner surface of said outer wall as it flows through said passage to said nozzle.

43. An apparatus as claimed in claim 41 in which are provided means for supplying air to said fuel passage at a point remote from said nozzle.

44. In apparatus of the class described, the combination of a nozzle comprising an elongated discharge opening, walls correlated to form a fuel passage leading to said nozzle, one of said walls being connected to one wall of the nozzle throughout its length and extending therefrom into the zone of the flame burning from said nozzle to be heated thereby, means for spraying liquid fuel in said fuel passage at a point remote from said nozzle and against the inner surface of said heated wall to vaporize it, and means in said passage arranged to act on the fuel so long as it remains in liquid form to distribute it against the inner surface of said heated wall.

45. In apparatus of the class described, the combination of an annular nozzle, annular walls one arranged within the other and forming between them an annular passage arranged to convey fuel to said nozzle, the outer annular wall being connected at its inner end to one wall of said nozzle and extending therefrom into the zone surrounded by the flame burning from the nozzle to be heated thereby, and means for conveying fuel through the inner annular wall and distributing it against the inner surface of said heated wall at a point remote from said nozzle.

46. An apparatus as claimed in claim 45 in which the distributing means operate to spray the fuel against the inner surface of said heated wall at a point remote from said nozzle.

47. An apparatus as claimed in claim 45 in which are provided means for supplying and mixing air with the fuel as it is distributed to said heated wall.

48. In apparatus of the class described, the combination of an annular nozzle opening, annular walls one arranged within the other and forming between them an annular passage arranged to convey fuel to said nozzle opening, the outer annular wall being connected to one wall of said nozzle opening and extending therefrom into the zone of the flame burning therefrom to be heated, means for supplying air and fuel through said inner annular wall, means for mixing and distributing the fuel and air against the inner surface of said heated wall in the passage at a point remote from said nozzle opening whereby the fuel flowing through the passage is vaporized.

49. An apparatus as claimed in claim 45 in which separate means are provided for supplying air to said nozzle for mixing with the air and fuel delivered from said passage.

50. In apparatus of the class described, the combination of a burner for vaporized fuel comprising a nozzle and inner and outer members forming between them a fuel passage leading to said nozzle and disposed in the zone of the flame burning therefrom, whereby the outer member is heated, one of said members being rotatable, and means carried by the inner wall for scraping carbon deposits and other ingredients from said heated wall.

51. In apparatus of the class described, the combination of a nozzle, a vaporizing chamber having a side wall disposed in the zone of the flame burning from said nozzle and a closed outer end, means for conducting air and fuel to said chamber at a point adjacent its closed end and for spraying the fuel against said side wall to effect vaporization thereof, and means for mixing the air and vaporized fuel as they flow to said nozzle.

52. An apparatus as claimed in claim 51 in which are provided adjacent said nozzle opening means for preventing the ignition of the fuel until it has been ejected from the nozzle.

53. An apparatus as claimed in claim 51 in which a wall bridges the nozzle and such wall is formed with slots for the discharge of the fuel to prevent pre-ignition thereof.

54. In apparatus of the class described, the combination of a burner for vaporized fuel comprising a pair of concentric members and a nozzle disposed at one end of the outer member arranged to heat the wall of said outer member, said members forming a passage, connected at one end to said nozzle, means for conveying fuel through said inner member to the opposite end of said passage, and means operating during operation of the burner for scraping deposits of carbon and other ingredients from the wall of said outer member heated by the nozzle flame.

55. In apparatus of the class described, the combination of a burner for vaporized fuel comprising a nozzle and a passage for the fuel leading thereto, said passage being formed by relatively movable spaced walls one of which is arranged to be heated by the flame burning from said nozzle, and means carried by the other wall for scraping deposits of carbon and other ingredients from said first mentioned wall.

56. In apparatus of the class described, the combination of a burner for vaporized fuel comprising a nozzle and a passage for the fuel leading thereto, said passage being formed by spaced walls, one of said walls being movable and the other wall being arranged to be heated by the flame burning from said nozzle, and means carried by said movable wall for scraping deposits of carbon and other ingredients from said heated wall.

57. In apparatus of the class described, the combination of a burner comprising a nozzle and a pasage for fuel leading thereto, said passage being formed by relatively movable spaced walls one of which is arranged to be heated by the flame burning from said nozzle, means carried by the other wall for scraping deposits of carbon and other ingredients from said first mentioned wall, and means for causing relative movement between said walls during operation of the burner.

58. In apparatus of the class described, the combination of a burner comprising a nozzle and a passage for fuel leading thereto, said passage being formed by spaced walls, one of said walls being movable and the other wall being arranged to be heated by the flame burning from said nozzle, means carried by the movable wall for scraping deposits of carbon and other ingredients from said heated wall, and means for moving said movable wall during operation of said burner.

59. In apparatus of the class described, the combination of a burner comprising a nozzle and a pair of concentric members spaced to form between them a fuel passage connected at one end to said nozzle, one of said members being arranged to be heated by the flame burning from said nozzle, means for conveying fuel through the other member to the opposite end of said fuel passage, and means operating during operation of the burner for scraping deposits of carbon and other ingredients from the inner surface of said heated member.

60. In apparatus of the class described, the combination of a burner comprising a nozzle and a pair of concentrically arranged, relatively movable members spaced to form between them a fuel passage connected at one end to said nozzle, one of said members being arranged to be heated by the flame burning from said nozzle, means for conveying fuel through the other member to the opposite end of said fuel passage, and means carried by the other member and operating during operation of the burner for scraping deposits of carbon and other ingredients from the inner surface of said heated member.

61. In apparatus of the class described, the combination of a burner for vaporized fuel comprising a nozzle and a pair of concentric members spaced to form between them a fuel passage connected at one end to said nozzle, one of said members being movable and the other member being arranged to be heated by the flame burning from said nozzle, means for conveying fuel through the other member to the opposite end of said fuel passage, and means carried by said movable member and operating during operation of the burner for scraping deposits of carbon and other ingredients from said heated member.

62. In apparatus of the class described, the combination of a burner comprising a nozzle and a pair of concentrically arranged, relatively movable members spaced to form between them a passage for fuel leading to said nozzle, one of said members being arranged to be heated by the flame burning from said nozzle, means carried by the other member for scraping deposits of carbon and other ingredients from said heated member, and means for causing relative movement between said members during operation of said burner.

63. In apparatus of the class described, the combination of a burner for vaporized fuel comprising a nozzle and a passage leading thereto, one wall of the passage being arranged to be heated by the flame burning from said nozzle, means for scraping deposits of carbon and other ingredients from said wall, and means for expelling through said nozzle the deposits scraped from said wall.

64. In apparatus of the class described, the combination of a burner for vaporized fuel comprising a nozzle and inner and outer members forming between them a passage leading to said nozzle, the outer member being arranged to be heated by the flame burning from said nozzle, means for rotating said inner member, and means carried by said inner member for scraping deposits of carbon or other ingredients from the inner wall of said outer member and for expelling through said nozzle, the deposits scraped therefrom.

65. In apparatus of the class described, the combination of a burner for vaporized fuel comprising a nozzle and inner and outer members forming between them a passage in communication with said nozzle, the outer member being arranged to be heated by the flame burning from said nozzle, means for rotating said inner member, means for scraping deposits of carbon or other ingredients from the wall of said outer member, and means operated by said inner member for expelling from said passage the deposits scraped from the heated wall thereof.

66. In apparatus of the class described, the combination of a burner for vaporized fuel comprising a nozzle and relatively movable members forming between them a passage in communication with said nozzle, one member being arranged to be heated by the flame burning from said nozzle, means for causing relative movement between said members, and means operated by the movable one of said members for scraping deposits of carbon or other ingredients from the wall of said heated member and for expelling from said passage the deposits scraped from the wall thereof.

67. In apparatus of the class described, the combination of a burner for vaporized fuel comprising a pair of concentric members and a nozzle disposed at one end of the outer member, whereby the flame from said nozzle heats the wall of said outer member, said members forming between them a passage connected at one end to said nozzle, means extending longitudinally of the inner member and disposed radially thereof for scraping deposits of carbon and other ingredients from the inner surface of said outer member, and means for rotating said inner member.

68. The herein disclosed process which consists in spraying fuel against a wall disposed in the zone of a flame burning from a nozzle opening so as to be heated thereby and supplying air in association with the sprayed fuel, then in conducting the sprayed fuel and air along the said wall throughout its length to the nozzle opening to permit vaporization of the fuel and mixture of the air with the fuel during its vaporization, and its conduction to the nozzle opening, and finally discharging the mixed air and vaporized fuel through the nozzle under pressure.

69. The herein disclosed process which consists in simultaneously and continuously spraying fuel against a wall disposed in the zone of a flame burning from a nozzle opening so as to be heated thereby and supplying air in association with the sprayed fuel, then in conducting the sprayed fuel and air along the said wall to the nozzle opening and distributing them in contact therewith throughout its length to effect vaporization of the fuel and mixture of the air therewith during vaporization and the conduction of the vaporized fuel and air to the nozzle opening, and finally discharging the mixed air and vaporized fuel through the nozzle opening under pressure.

70. The herein disclosed process which consists in simultaneously spraying fuel against a wall disposed in the zone of a flame burning from a nozzle opening so as to be heated thereby and supplying air in association with the sprayed fuel, then in conducting the fuel and air along the said wall throughout its length to the nozzle opening and distributing them in contact therewith to effect vaporization of the fuel and mixture of the air with the vaporized fuel during its vaporization, then in discharging the mixed air and vaporized fuel through the nozzle opening under pressure, and maintaining the ignition of the mixture at or beyond its point of discharge from the nozzle opening.

In testimony whereof I have hereunto signed my name.

HOWARD I. MORRIS.